Dec. 28, 1965 E. GORDON ETAL 3,226,532

COMPUTER APPARATUS FOR SCANNING A CHART RECORD AND DETERMINING A MATHEMATICAL RESULT THEREFROM

Filed May 9, 1962 10 Sheets-Sheet 1

INVENTORS
EDWARD GORDON
DURWARD F. SEARCY
JOE T. COTTEN

BY Adolph C. Hugin

ATTORNEY

Dec. 28, 1965 E. GORDON ETAL 3,226,532
COMPUTER APPARATUS FOR SCANNING A CHART RECORD AND DETERMINING A MATHEMATICAL RESULT THEREFROM
Filed May 9, 1962 10 Sheets-Sheet 2

INVENTORS
EDWARD GORDON
DURWARD F. SEARCY
JOE T. COTTEN
BY
Adolph E. Hugin
ATTORNEY

INVENTORS
EDWARD GORDON
DURWARD F. SEARCY
JOE T. COTTEN

BY Adolph C. Hugin
ATTORNEY

INVENTORS
EDWARD GORDON
DURWARD F. SEARCY
JOE T. COTTEN
BY Adolph C. Hugin
ATTORNEY INVENTORS
EDWARD GORDON
DURWARD F. SEARCY
JOE T. COTTEN
BY
Adolph C. Hugin
ATTORNEY

INVENTORS
EDWARD GORDON
DURWARD F. SEARCY
JOE T. COTTEN

BY Adolph C. Hugin
ATTORNEY

INVENTORS
EDWARD GORDON
DURWARD F. SEARCY
JOE T. COTTEN
BY
Adolph C. Hugin
ATTORNEY

INVENTORS
EDWARD GORDON
DURWARD F. SEARCY
JOE T. COTTEN

BY Adolph C. Hugin
ATTORNEY 3,226,532

COMPUTER APPARATUS FOR SCANNING A CHART RECORD AND DETERMINING A MATHEMATICAL RESULT THEREFROM

Edward Gordon, Durward F. Searcy, and Joe T. Cotten, Shreveport, La., assignors to United Gas Corporation, a corporation of Delaware Filed May 9, 1962, Ser. No. 193,573
16 Claims. (Cl. 235—164)

This invention relates to computers and to methods for reading charts and making desired computations from such readings by apparatus which will give the result of the computations in intelligible form. Such computers, their components, and the methods of computation are particularly useful for reading charts having two traces thereon representing records of two different values and for computing the square root of the product of the values represented by the two traces.

Measurement of natural gas flow through a pipeline is an example of a use in which a computer using the method of the present invention can be particularly useful. Gas flow through such a pipeline is measured by comparing the static pressure with the differential pressure across an orifice in the line. These two variable pressures are recorded on charts, usually of the circular type, as a function of time. The instantaneous flow rate in the line varies as the square root of the product of these two pressures. The total accumulated flow during any period of time is the integral of the instantaneous flow rate integrated over the desired period.

Presently, the method used for determining the recorded information from the circular chart and making the necessary computation to obtain the integral of the square root of the product of the pressures involves the use of a manually operated mechanical computer commonly known as an "integrator." In using such an instrument, an operator manually retraces the two pressure lines on the chart with two independently mounted pens or styluses. The pressures thus sensed by the pens are used as inputs to a mechanical analog computer which integrates the information thus derived from the chart.

In thus tracing the pressure lines on the chart, it is necessary that the chart be rotated at a speed which is continuously controllable by the operator. This control usually is provided by a foot pedal or similar device, as the operator is required to use both hands, simultaneously moving one pen with each hand in tracing the two pressure lines on the chart. This requires that the operator coordinate three different motions and, consequently, is subject to considerable human error, even when employed by an experienced operator. In addition, this method is very time consuming.

In accordance with the present invention, a chart having traces thereon is adapted to be scanned by an electromagnetic means and the information obtained by this scanning provides for the initiation and generation of signals representative of the linear values of the traces sensed by the scanning means. These signals representative of the linear values energize and bias variously interconnected counters and gates so as to generate signals representative of the logarithms of the values. The signals thus generated during a scanning cycle are impressed on other suitable gates and counters so as to provide for the summation of a count representative of one half the sum of the logarithms of the linear values of the two traces sensed during the scanning cycle. This summation then is stored in a suitable memory, such as a binary counter, and the compute cycle of the equipment proceeds while the scanning means returns to the starting point or reference base on the chart. During this compute cycle, a signal is generated representative of a logarithmic count and this is compared to the previous logarithmic summation, while a linear count is simultaneously entered into a suitable integrator or accumulator. When the count representative of the logarithms generated during the compute cycle equals the previous logarithmic count summation, the linear count entered into the accumulator is stopped and the compute cycle is thus completed. This linear count in the accumulator represents the antilog of the logarithmic count and equals the square root of the product of the two pressures recorded as the traces on the chart which is being scanned. The accumulator is adapted to integrate successive antilogs until the desired number of scans of the chart have been made so as to cover the period of time for which the total accumulated flow is desired.

An embodiment of a computer made in accordance with the present invention may be provided with a scanning arrangement including a series of lenses spaced around the periphery of a rotating optical scanning disc which turns above the chart being processed. The relative positions of the optical scanning disc and the chart are such that the paths which the lenses follow across the face of a chart are the same as the paths which were followed by the meter pen arms in making the records on the chart. As each scanning lens moves across the face of the chart, the portion of the chart viewed or sensed by the scanning lens is focused on a suitable photomultiplier tube. The chart is rotated in timed relationship with the speed of the optical scanning disc such that, as one scanning lens completes its scan across the chart, the rotation of the chart will present a different reading path to the ensuing lens. Thus, when the chart has completed one revolution, the scanning disc will have moved the optical system across the face of the chart a predetermined number of times and will have taken the desired observations of the chart record. The photomultiplier tube senses the location of the two pressure records on the chart and initiates the generation of signals which are impressed upon the counters and gates in the systems, as has been described, to provide for the entry of the desired antilog in the accumulator for each scan.

Since most charts are formed with grid lines indicative of linear values and of increments of time, the photomultiplier tube is made so that its color sensitivity prevents it from registering when it views a certain color and the grid lines are printed on the chart in this color, with the result that the photomultiplier tube fails to see them. The colors for the pressure traces are selected so as to cause a response from the tube as the optical system scans a chart, so that substantially no signal will emanate from the tube, except when the trace records are sensed during a scan.

Since the illustrated embodiment of the present invention uses an electromagnetic scanner in the form of an optical instrument which takes its data optically from the face of the chart, it is necessary that the chart be reasonably clean. The computing system is built and provided with electrical circuits so that the scanning of a chart and the resulting computation is successfully accomplished if the photomultiplier tube senses only two traces during each scan. If any undesirable markings, dirt, or ink are on the chart, the photo tube in the scanner may see these unwanted markings and produce more than the two signals which are needed to complete a calculation by the computer. The computer is unable to determine which two of the several signals are correctly representative of the traces and, as a consequence, a correct calculation cannot be made for such a scan.

In order to avoid the accumulation of errors due to the non-use of scans of portions of the chart containing unwanted marks, a memory circuit is built into the computer which stores the result of each single good scan. This stored result is replaced by each subsequent result of a good scan and is used as a substitute for the result of a bad scan when such occurs. In this way the value of the last good scan is available to the computer whenever an unusable scan is encountered. Such a substituted value normally is very close to the value which would have resulted had the unusable scan been a good scan. No series error is thus occasioned by this method of computation unless the chart records are extremely erratic or the unwanted markings are extensive. The memory circuit is also utilized with a normal or clean chart whenever the pressure traces on a chart cross over or superimpose on one another. In these cases, the computer receives only one signal and thus cannot perform its normal calculation. The result of the computation made just prior to the crossing of the lines is stored in the memory circuit and is also substituted in this situation. Here again, the probable error due to such a substitution is very small.

In scanning a chart for determining the linear values of traces thereon which are to be converted into signals representative of the logarithms of the linear values, it is desirable to divide the ordinates of the chart into measurable units which are usable in a binary counter, that is, the units should progressively double from the zero reference base for each unit value toward the largest unit. In this manner, the values read in progressive units need simply be entered into the next higher flip-flop of the binary counter. With such ordinates, the largest unit should be subdivided into increments to give a reasonable resolution to a trace sensed by the scanner in the largest unit. This, of course, requires that the counter or shift register be provided with a corresponding number of entry points in order that the value of the trace sensed by the scanner can be properly entered.

In accordance with the present invention, the increments of the ordinates of a chart are conveniently measured by clock pulses. It therefore is necessary that a predetermined number of clock pulses occur for any complete scan. If this predetermined number of clock pulses does not occur, then the proper number of shifts will not occur in the shift register or counter and this will indicate a bad scan. The measurements made during such a bad scan should not be entered into the computed results. This is another condition under which a bad scan indication is provided and the result stored in the memory circuit from the last good scan is substituted in the computer for the result of such a bad scan.

In order to assure against too many substituted computations in the integrated result, a bad scan counter may be provided which will give an indication that a predetermined number of bad and unusable scans have been made. When an operator receives such an indication, the chart may be removed from the computer and may subsequently be cleaned, or processed by a mechanical computer or, if too illegibile, simple be discarded as entirely unusable. Large amounts of ink splotches, dirt or similar markings can be masked off the chart by covering with an adhesive white paper tape which can be quickly applied over the unwanted markings. A pen can also be used to apply heavy white ink for covering relatively minor marks or ink splatters.

Some charts present reading difficulties regardless of the type of equipment used for interpreting the values recorded thereon. A rapidly pulsating recording pen may present a "paint brush" or extremely wide trace record. Also, if relatively large flow changes occur in short intervals of time, it may be difficult properly to compute the summation of the record. This latter type record often is typified by flow measurements of some oil well gas lift equipment. In such cases where the charts are clean of unwanted markings and a large number of substituted readings are encountered due to the erratic recordings or too numerous crossings of the two traces, it may be advisable to obtain an average of two computations so as to minimize the effect of the multiplicity of substituted computations in the accumulator. In the case of wide traces, such as those involving "paint brush" records, special circuitry is provided in accordance with the present invention which resolves the average value of the wide record. This is in accordance with the practice in many chart offices using mechanical computers, and often is quite as correct as can be ascertained with computations made by any method from such records.

In order to simplify the circuitry of the computer so that the scanner need not discriminate between the two pressure traces on the chart, that is, between the static and the differential pressure traces, it is necessary that the static pens on each recording meter be set to absolute pressure. Generally, this can readily be done, and users of square-root charts already have static pens set in this manner. Thus, the addition of atmospheric pressure to the static pressure reading through the adjustment of the static pressure pen of the recording meter enables the computer to calculate the square root of the product of the two pressures rather than the square root of the differential pressure times the static pressure plus barometric pressure. This greatly facilitates the use of the present computer invention, as it makes no difference which trace is read first, since all of the trace values are made as a percentage of the full scale of the chart and the lines may cross over without producing any scanning or computing difficulty.

A computer incorporating the present invention produces an integrated output or result in terms of percent of the chart scale so that actual scaling factors need simply be introduced in a subsequent computation. This, however, is not an added problem in the use of the present computers, as this procedure also is followed when using manual integrators. A computer constant also is predetermined and used in all chart computations, together with the usual corrections for temperature, gravity, and orifice constant.

An object of this invention is to provide an improved computer and method for scanning a chart record and determining a mathematical result from the values indicated by such a record.

Another object of this invention is to provide an improved computer and method for reading a chart having two traces thereon and determining the square root of the product of the values represented by the two traces.

A further object of this invention is to provide an improved computer and computer components for scanning records on a chart and computing, from the instantaneous values thus scanned, the result measured by the records and integrating these computations to provide a final summation of the record on the chart.

Still another object of this invention is to provide an improved computer for determining the square root of the product of two values.

A yet further object of this invention is to provide an improved computer and method for representing the logarithm of linear values.

Yet another object of this invention is to provide an improved computer and components for generating signals representative of the logarithm of values sensed by a scanning means and performing a mathematical operation with such signals.

Another object of this invention is to provide an improved apparatus and method for determining the square root of the product of two variables read from traces on a chart in which successive sets of readings are taken at successive time increments and wherein the last good reading is substituted for any bad reading until a new good reading has been taken.

A further object of this invention is to provide an improved method and apparatus for converting linear values into signals representative of the logarithms of the linear values, entering a count in a binary counter responsive to these signals for making computations with the logarithmic values represented by the signals, and extracting the antilog of the result of these computations as a linear value.

Another object of this invention is to provide an improved computer and method of reading and utilizing records on a chart, wherein a scanner is provided for reading the records on the chart so as to give an indication of the value of the record from a reference base to the leading edge of a trace forming a record and also an indication of the width of the trace, with a determination of the trailing edge of the trace for each of the records on the chart, and combining the results of the scanning in a computer to give a half-width correction of the trace to the value represented by the trace on the chart.

Still another object of this invention is to provide an improved scanner for reading values represented by traces on a chart and obtaining a more accurate determination of the record by correcting values sensed by the recording head for the width of each trace so as to give a resultant evaluation of the record so represented extending to the middle or half width of each respective trace.

A yet further object of this invention is to provide an improved scanning head for reading and evaluating trace records on a chart with provision for adjustably signalling the start and end of a scan whereby the scanned value of a reading to be used in a computation is determined by the reference base set by the start and end scan.

Further objects and advantages of this invention will become apparent from the following description referring to the accompanying drawing and the features of novelty which characterize this invention will be pointed out with particularity in the claims appended to and forming a part of this specification.

Figure 3:
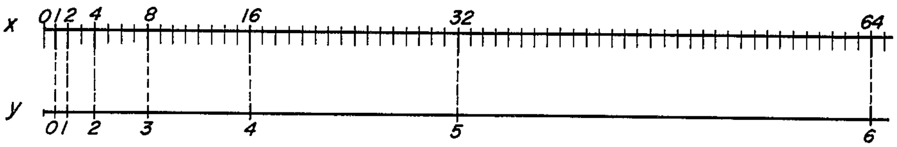
Figure 4:
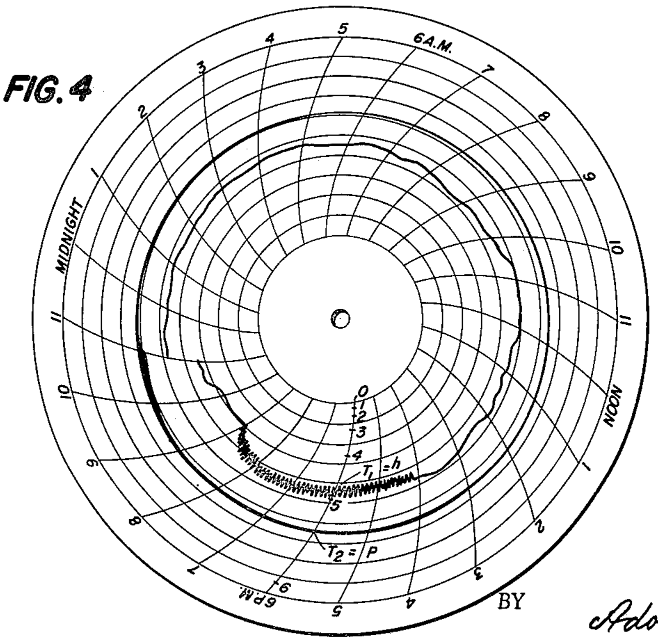
Figures 5, 6:
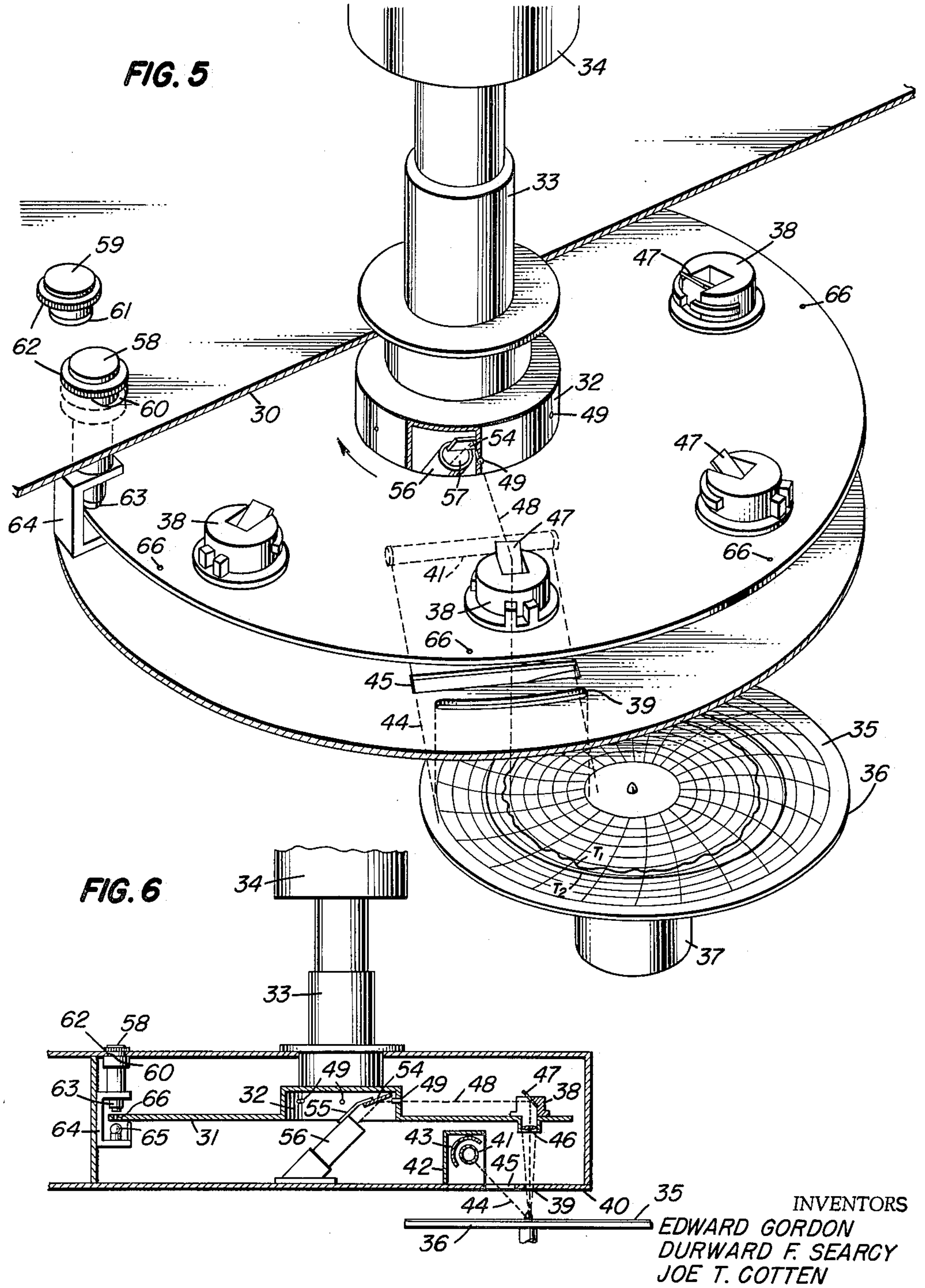
Figure 8:
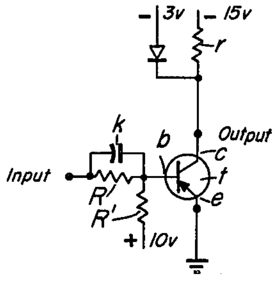
Figure 9:
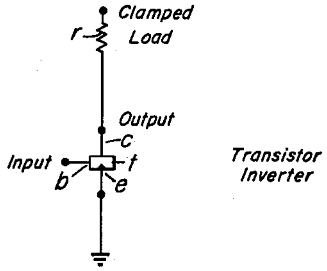
Figure 10:
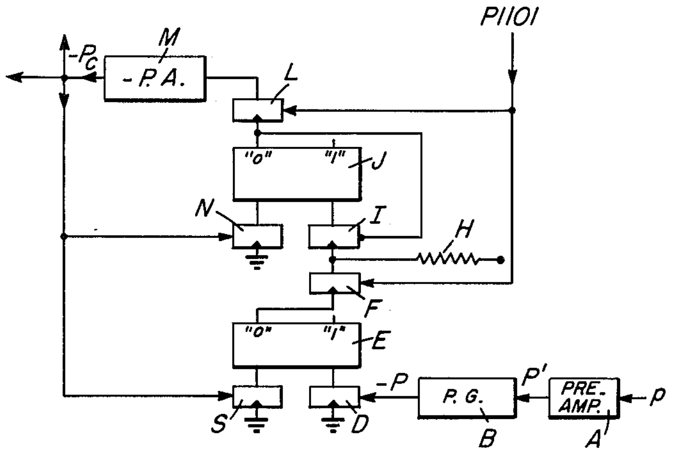
Figure 7:
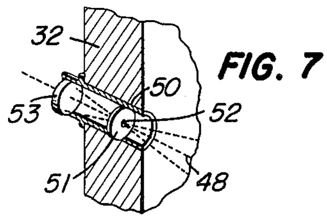
Figure 11A:
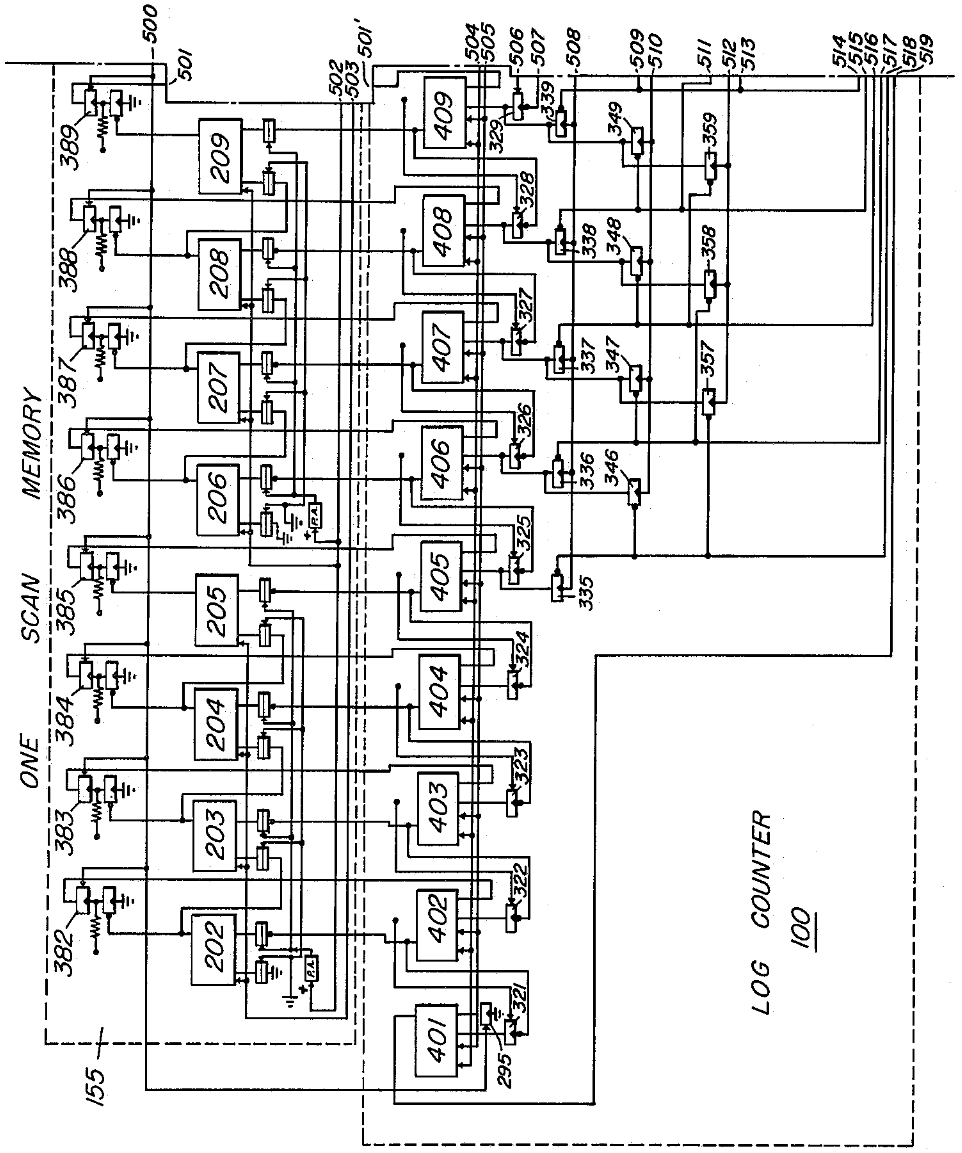

FIG. 3 graphically illustrates the manner in which linear values on a chart may be weighted for entry into a binary counter in terms of logarithmic values in order to provide the largest unit with a reasonable resolution, that is, in order to divide the largest unit scanned on a chart into sufficiently small increments to give a reasonable evaluation to the measurement represented by a trace in this portion of the chart;

FIG. 4 illustrates a circular chart of the type used in measuring the flow of gas in a pipeline and of the type which can be readily read and evaluated in accordance with the apparatus and method of this invention;

FIG. 5 schematically illustrates, in a partially broken away perspective view, the basic elements of an improved scanner made in accordance with the present invention;

FIG. 6 is a side elevational view, partly is section, of the improved scanner schematically illustrated in FIG. 5;

FIG. 7 is an enlarged perspective view, partly in section, of the scanning head beam-directing aperture member;

FIG. 8 is a schematic illustration of an inverter comprising a transistor and a clamped load resistor on the collector output of the transistor;

FIG. 9 illustrates the simplified logic symbology to be used in the other logic and schematic diagrams illustrative of the transistor inverter circuitry shown in FIG. 8;

FIG. 10 schematically illustrates the logics of a synchronizing circuit which is utilized in the computer described in this application as an illustration of the present invention for synchronizing the pulses from the scanner with the clock pulse; and FIGS. 11*a*, *b*, *c*, *d*, *e*, and *f* comprise respectively the upper left, center and right, and the lower left, center and right portions of a schematic logic diagram illustrating a computer embodying the present invention. Corresponding numerals are applied to lines extending between these figures.

Referring to the drawings, a computer embodying the present invention for carrying out the improved method of computation is illustrated which is particularly adaptable for use in computing the gas flow in a pipeline. This computer incorporates various aspects of the present invention including an improved system for generating signals representative of the logarithms of values and an improved system for utilizing these signals in circuitry connecting counters, gates, and pulse generators for providing a desired computation with the signals and deriving therefrom a final desired result. In addition, this computer includes an improved arrangement for scanning chart records and measuring the values represented thereon at predetermined spaced time increments, computing a desired result with these measured values by the improved logarithmic type computer system, determining the antilog of the result, and integrating these antilogs to provide a final integral of the computed results for the chart record during the time scanned.

In utilizing a computer of this type to determine gas flow, the conventional logarithmic procedure of determining the square root of the product of a differential pressure and an absolute pressure is employed. These two pressures are conventionally recorded as traces on a chart by an orifice chart meter. Such a meter consists of a pair of pens which record two traces on a chart corresponding to two measurements, one of the absolute pressure P at the time of the recordation and the other of a differential pressure $h$ across an orifice. These pressures usually are recorded on a circular chart such as that shown in FIG. 4 wherein the pressure measures are the ordinates of the traces and the time increments are the abscissa. The chart shown in FIG. 4 illustrates a record kept for approximately one day from 11:00 p.m. to 11:00 p.m. The quantity Q to be determined by a flow calculation from such a record is the integral of the square root of the product $hp$. This is an accepted formula for such a calculation.

In order to utilize simple electronic counting units in the illustrated computer, the linear values indicated by the traces on the flow chart are electronically resolved into signals representative of the logarithms of the values to be used in the calculations.

A simple mathematical analysis of the problem readily indicates that it is desirable to measure the linear values of the traces $T_1$ and $T_2$, FIG. 4, in terms of units which can be utilized in a binary counter. Such units would progressively double from the reference base zero towards the largest unit at the outer edges of the chart. This enables the use of the values read in progressive units with a simple binary counter wherein the measure of each unit is entered into the proper weighted flip-flop of the counter. These units are indicated on FIG. 4, for example, by the points 1, 2, 3, 4, 5, and 6 on the 6:00 p.m. time abscissa. As there shown, it is necessary to resolve the larger units to provide for an accurate determination of the value of the traces located in these larger units. This can readily be done by properly subdividing the largest unit into increments to give a reasonable resolution to a trace sensed by the scanner in this largest unit. The progressively smaller units then properly can be divided, in each instance, into one half the number of increments of the next larger unit so as to give the same resolution of the measurement throughout the chart.

Obviously, with this mode of measurement, the smallest unit must have at least one increment, as a binary counter is not able to use fractional values. This is more readily understandable by reference to FIG. 3, where a linear representation of this type of measurement unit is shown on an enlarged straight-line scale. The units 1 to 6 are shown an enlarged straight-line scale. The units 1 to 6 are shown in the lower line as *y*, wherein each unit progressively doubles in length from zero to 6, similar to that in the chart of FIG. 4. The largest unit 6 is subdivided into 32 increments, and progressively the smaller units each are divided into half the number of increments of the next larger unit. In this illustration, the increments were chosen as exactly equal to the smallest unit extending from zero to 1. If a greater resolution were desired, the increments could be made smaller and, in the computer illustrated in these drawings, the scanner and the electrical system are constructed and connected to provide eight full units for a complete scan along the ordinates of a chart and the largest unit may be subdivided, for example, into 200 increments so that 400 increments equal a complete scan.

Figure 1:
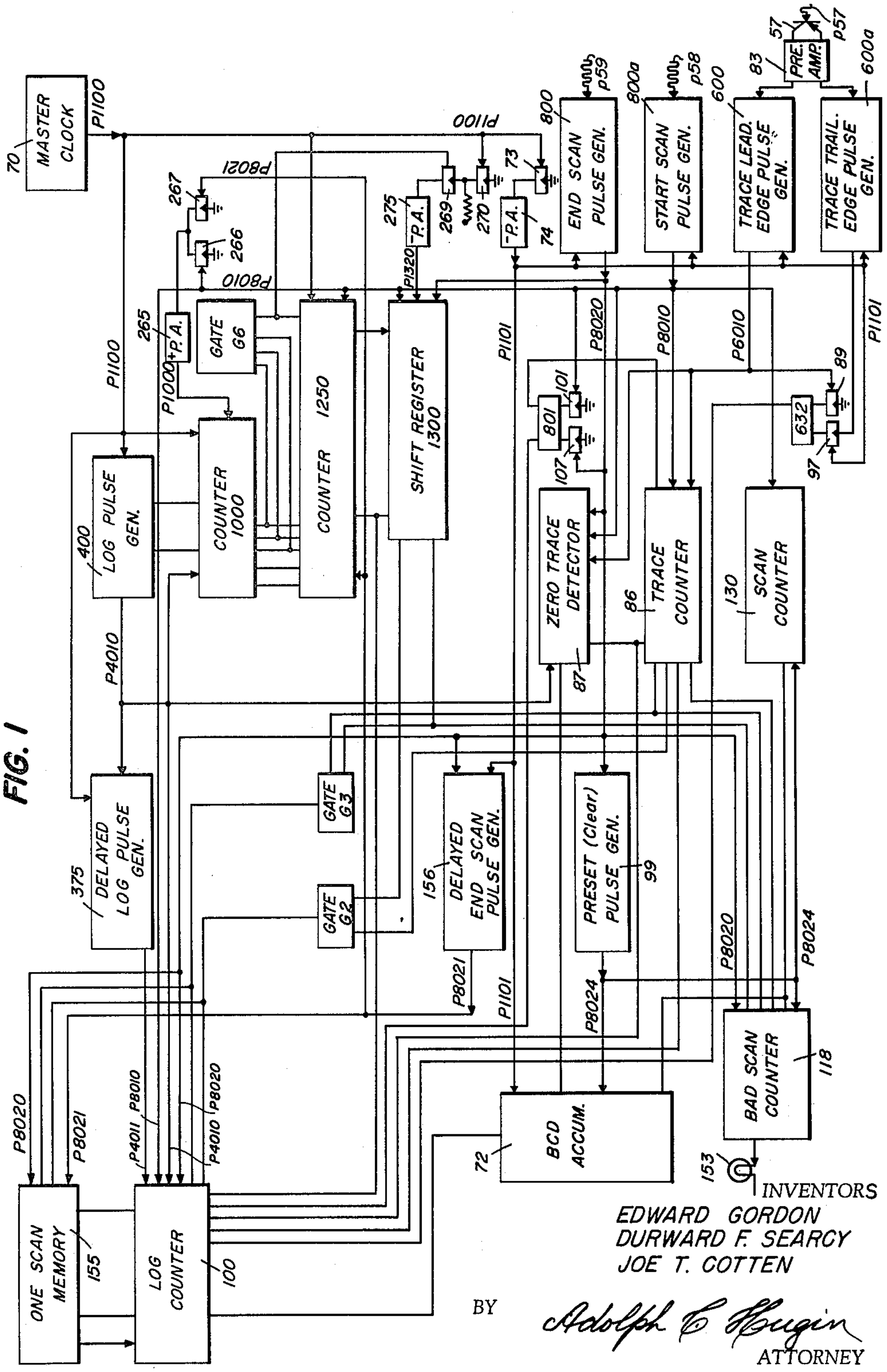
FIG. 1 is a logic diagram illustrating a computer embodying the present invention.
Figure 2:
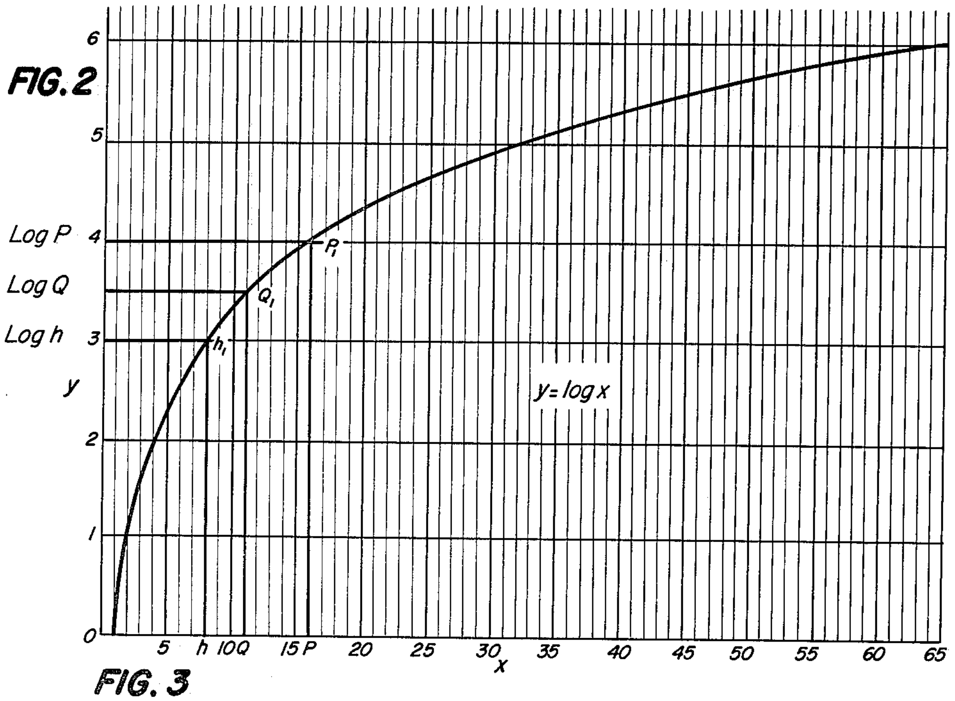
FIG. 2 is a graph illustrating the general mathematical expression $y=\log x$ and the application of the relationship expressed by this curve in providing a simple solution to the logarithmic computation utilized in carrying out the present invention for determining the square root of the product of two values.

This type of measurement of the linear values on a chart also facilitates utilization of the measurements by signals or pulses representative of the logarithms of the linear values. In FIG. 2 a logarithmic curve is illustrated wherein the ordinate $y$ is equal to the logarithm of $x$. As is well known from mathematics, the quantity Q, equal to the square root of the product of $h$P, is equal to the antilog of one half the sum of the log $h$ plus log P. Thus, $$\text{(1)} \qquad \log Q=\frac{\log P+\log h}{2}$$

or $$\log Q=\log h+\frac{(\log P-\log h)}{2}$$

Referring to FIG. 2, it can readily be seen that, if $h$ is determined as the linear value by the scanning of a chart, its logarithmic value will be log $h$ as projected from the point $h_1$ on the curve $y=\log x$. Similarly, if the pressure P is determined by scanning a chart, its logarithm log P can be determined by projecting from the point $P_1$ on the logarithmic curve to the ordinates of the graph. According to Equation 2, the square root of the product of $h$ and P is equal to the antilog of Q, which is equal to the antilog of log $h$ plus half the difference between the log P and log $h$. In FIG. 2, we determine log Q, therefore, as graphically being the ordinate half way between log $h$ and log P. A projection of log Q to $Q_1$ on the logarithmic curve determines the value Q, which is the antilog of log Q as stated above. This method of determining the value Q is performed, according to the present invention, by a computer.

The improved computer illustrated in the drawings is adapted to read the values of $h$ and P represented by traces $T_1$ and $T_2$ respectively on a chart, such as that shown in FIG. 4, and to provide an optical signal when the effective center of a scanning lens passes over the traces recorded on the chart. It also provides a signal at a preselected "start" reference base when the lens is a specified short distance below the zero reference base on the chart. In addition, it provides a signal when the lens reaches the end of a scan which represents the outer edge of the chart on which trace level information may be recorded. These optical signals are converted by appropriate devices into electrical pulse signals which are utilized to control the computations of the computer.

*Scanning head*

The major mechanical elements of the computer which are utilized to obtain the electromagnetic scanning of a chart record are illustrated in FIGS. 5, 6, and 7. A scanning head is provided which is mounted on the main stationary frame 30 of the computer. This scanning head includes a scan disc 31 mounted on a central cylindrical hub 32 which is adapted to be rotated by a precision gear power transmission unit 33 driven by a suitable synchronous driving motor 34. A chart 35, which is to be read by the scanning head, is placed on a turntable 36 which is adapted to be driven in a predetermined synchronous relation to the speed of the scan disc 31 by any suitable means, such as a slow speed precision gear-motor 37. In the illustrated embodiment a plurality of scan lens units 38 are mounted in spaced relation on the scan disc 31 for viewing the chart 35 through a scan slot 39 in a stationary plate 40 of the main frame 30. The chart 35 is adapted to have the portion thereof directly below the scan slot 39 illuminated by a suitable source of light, such as a fluorescent light tube 41 stationarily mounted in a casing 42 on the plate 40. A suitable reflector 43 is adapted to aid in directing a light beam 44 through a slot 45 to illuminate the desired portion of the chart 35 under the scan slot 39.

The electromagnetic scanning is performed by an optical system including a scan lens unit 38 which includes a concentrating scan lens 46 and a beam-directing mirror 47 which reflects the beam, as indicated at 48, into a beam-directing and focussing aperture member 49 mounted in the cylindrical hub 32. Each scan lens unit 38 is provided with such an aperture member which functions to limit the amount of light which is utilized for scanning the chart to a very small ray of light, whereby extremely accurate measurements are made by the readings provided by these units. FIG. 7 shows in detail the structure of a beam-directing and focussing aperture member. This member includes a cylindrical mounting tube 50 rigidly supported in the hub 32 which is radially directed towards the center of the hub in line with the optical reflected center of the scan lens 46. An apertured disc 51 is rigidly mounted in the tube 50 and is formed with a central aperture 52 in line with the axis of the tube 50. A concentrating and focussing lens 53 is rigidly mounted in the tube 50 adjacent to the inner end thereof for directing and focussing the scanning beam on a redirecting mirror 54. This mirror is stationarily mounted by a suitable bracket 55 on the casing 56 of a photomultiplier tube 57 which is arranged so as to receive the reflected scanning beam substantially at the center of rotation of the scan disc 31. This mounting of the photomultiplier tube provides for the efficient utilization of each of the scan lens units 38 and their associated aperture members 49, all of which focus and direct, in turn, the scanning beam on this single photomultiplier. In this manner, the associated computer circuitry also is simplified, as all of the scanning signals are received and transmitted from a single source.

Various types of arrangements can be provided for initiating signals which correspond to the start and end of a scan. The initial reception and closing off of the scanning beam when the center of the scan lens 46 passes respectively over the beginning and end of the scan slot 39 could be utilized to provide signals indicating the start and end of a scan. In order more effectively to provide independent start and end scan signals, it is desirable to provide for an independent source thereof. Furthermore, it is desirable to provide for a limited amount of adjustment in the generation of these two signals to control the amount of measurement provided by the scan lens units which will be utilized for the calculations to be made by the computer. These desirable results can be obtained with a construction, such as that illustrated in FIGS. 5 and 6, wherein the scanning head is provided with independent scan control pulse generators 58 and 59 which are adjustably mounted respectively in slots 60 and 61 in the main frame 30. Any suitable mounting elements, such as lock nuts 62, can be provided for drawing the pulse generators 58 and 59 snugly and rigidly into position on the frame 30. Each pulse generator is provided with a suitable photomultiplier tube 63 and a bracket 64 extending under the scan disc 31 for supporting a suitable light source 65 under an aperture 66 in the disc 31. The aperture 66 preferably is positioned a slight distance circumferentially ahead of each scan lens unit 38 and the "start scan" pulse generator 58 is mounted in the slot 60 so that the aperture 66 will be aligned with the source of light 65 and the photomultiplier 63 when the center of a scan lens 46 is a predetermined short distance ahead of the zero reference base of the chart which is being read. This provides for the generation of a "start scan" pulse which is supplied to the circuitry of the computer to indicate that a scan has begun. The reason for starting the scan slightly below the zero reference base is because, under certain circumstances, a trace may appear on a chart at or slightly below this zero reference base. If the "start scan" did not begin slightly ahead of this zero reference base, such a scan would not count the low-value trace and the computation made from such a scan would be rejected as a bad scan. This arrangement avoids rejection of such a scan and provides a good computation therefrom. The mounting of the "start scan" pulse generator in the slot 60 enables an operator to adjust the position at which a "start scan" signal can be received so as to provide for slight variations in the charts and particularly where it is noted that traces tend to appear at or slightly below the zero reference base of the charts.

A similar mounting and photoelectric detecting and pulse generating arrangement is provided by the "end scan" generator 59 and its mounting in the slot 61. Only one aperture 66 is needed for each scan lens unit to provide both the "start scan" signal and the "end scan" signal, as the two pulse generators 58 and 59 are adapted to be spaced apart a predetermined distance corresponding to the desired traverse of the scan reading of the scan lens 46 over a chart 35. Obviously, a variety of mechanical scanning head structures, as well as a variety of components can be utilized to provide the desired scanning of the chart, as well as the "start scan" and "end scan" control signals.

*General system logics*

In order to simplify the description and illustration of a suitable computer circuit embodying the present invention, certain simplified symbology will be used in the drawings. FIGS. 8, 9, and 10 illustrate this simplified symbology with generally applicable references thereon. One of the important symbols which appears repeatedly in the logics and circuitry of the disclosed embodiment of this invention is a transistor inverter unit. FIG. 8 illustrates such a unit. Junction transistors preferably are used in the illustrated circuitry, as these provide very compact, efficient, and reliable units. The control of such transistor inverter units may include varying the potential on the transistor emitter or applying negative pulses to the transistor base input. FIG. 8 illustrates the usual circuitry for such transistor inverters. As there indicated, the emitter *e* may or may not be at ground potential and the collector output *c* also may or may not be at a negative potential. When such a junction transistor *t* is turned completely on or "saturated," the collector is practically a short circuit to the emitter of the transistor. If the emitter is at ground in this condition, the output from the collector will also be at ground voltage.

When a junction transistor is turned completely off or "opened," the collector-to-emitter path is practically an open circuit. If the collector is connected to a clamped load resistor *r*, the collector *c* will be at −3 volts.

The schematic view in FIG. 8 shows an inverter and clamped load resistor. The capacitor *k* shunting the input resistor R is used to provide overdriving current to the transistor *t* during input level changes, thus switching the transistor much more rapidly. The resistor R′ to +10 volts biases off the transistor to protect against noise voltage. The load resistor is clamped to −3 volts with a diode so that, when the transistor is off, the output signal is always at −3 volts regardless of the loading on the inverter output.

To simplify logic drawings, the symbology of FIG. 9 is used. When the input is negative and emitter is grounded, the output is "shorted" to ground. When the input is positive or at ground level, the transistor is open circuited and the output, if connected to a clamped load resistor *r*, is at −3 volts.

Furthermore, in order to simplify the description of the logics and schematic diagram, a single reference character will be used to designate any one particular inverter, and the letters *b*, *c*, and *e* respectively will be used to designate the base input, collector output, and emitter of the respectively numbered inverters.

In addition, simplified symbology will be utilized to illustrate pulse amplifiers, pulse generators, conventional bi-stable flip-flops, complementing bi-stable flip-flops, and simple "buffer" memory units in accordance with the illustrations for such units to be found in the booklet entitled "DEC Building Block Logic," copyrighted 1960, by Digital Equipment Corporation, respectively on pages 16, 17, 12, 14 and 18, and 13. These computer units also are described on the pages mentioned.

The orifice meter chart computer, illustrated in FIG. 1 and FIGS. 11*a–f*, is provided with a series of interconnected counters and gates which function continuously whenever the system is energized and is provided with clock pulses P1100 from a master clock 70. No utilization is made of the summations and computations resulting from the continuous operation of the interconnected counters until a "clear" button 71 is depressed to close a working circuit so that the results of the various counters can be summarized in a suitable accumulator 72. In the embodiment of this computer which has been built, it was determined that the summation of 400 scans for a complete circular chart containing traces which were to be used in making the computations by the computer would provide an integrated result which would be very well within the accuracy of the chart record and, therefore, would provide a satisfactory resultant computation. Provision is made, therefore, for stopping the summation of the computed results in the accumulator 72 when a chart has been scanned over 360° at the end of 400 scans. The mechanical drives and the electrical circuits are established and synchronized so that there will be exactly 400 optical scans of a chart 35 during one complete revolution of the chart under the scanner slot 39.

The various pulses which are utilized in the working circuitry of this computer are all required to have a minimum amplitude, so that spurious pulses which may be generated by various sources of vibration, such as noises or slight variations in the optical signals received by the various photomultipliers, will have no effect on the computations. Furthermore, if the desired signal pulse were to occur at a time so that the potential of the flip-flop to be affected by it had not yet reached the desired voltage when a clock pulse occurred, the resultant control pulse corresponding to the optical signal pulse would not have the desired minimum amplitude and might not, therefore, be distinguishable from various spurious pulses appearing in various parts of the computer circuitry. In order to overcome this possible undesirable failure of the computer to recognize a control pulse, each part of the system to which a signal pulse is supplied for the initiation of a corresponding control pulse is provided with a clock pulse synchronizing circuit.

*Clock and signal pulse synchronizing circuits*

A circuit, FIG. 10, is provided which may be termed a synchronizing circuit for the generation of each of the control pulses −Pc corresponding to a signal pulse *p* which is used to control the operation of the computer. This circuit provides for synchronizing the signal pulse *p* with a clock pulse in order to assure a desired minimum amplitude of the control pulse —P which results from the signal pulse *p*. Such synchronizing circuits are used in connection with the "start scan" signal, the "end scan" signal, and the "trace leading edge" and "trace trailing edge" signals. The master clock 70 generates a clock pulse P1100 which is the basic working pulse for the entire computer system and is fed to various counters and pulse initiating circuits at all times while the computer system is energized.

One circuit to which the master clock pulse P1100 is fed is to the base input **73*b* of an inverter 73 with a grounded emitter 73*e* and a collector 73*c* connected to a pulse amplifier 74 which delivers amplified clock pulses P1101** to various pulse initiating circuits.

The synchronizing circuitry for generating a control pulse indicative of the start of a scan, the end of a scan, and the leading edge of a trace are all subtantially the same and are generally illustrated in FIG. 10, while the synchronizing circuit for generating the pulse indicative of the trailing edge of a trace is slightly different from the preceding three circuits.

The optical signal for scan start and scan end are formed by the two separate scan control pulse generators 58 and 59 which comprise photoelectric cells or photomultiplier tubes 63 from which light normally is shielded by the opaque rotatable scanning disc 31. When light passes through one of the apertures 66 in the scan disc, it provides an optical signal, which will cause the photoelectric cell to generate a pulse, which is then fed to a preamplifier A which, in turn, transmits a pulse P′, indicative of the start or end of a scan, to a pulse generator B, which generates a negative pulse —P. This pulse —P is transmitted to the base input D*b* of an inverted D having a grounded emitter D*e*. This in turn sets a flip-flop E, so that its "0" terminal is grounded, which grounds the emitter F*e* of an inverter F. This places the inverter F in condition to allow the first ensuing amplified clock pulse P1101 impressed upon its base F*b* to ground its collector F*c*, which in turn grounds the emitter I*e* of a second inverter I. The emitter I*e* of this second inverter I is clamped to a load resistor H so as to provide a negative bias of three volts thereon. When the action of the clock pulse P1101 grounds emitter I*e* and removes the clamped —3 volt load resistance bias, the inverter I is in condition to be turned ON when its base I*b* is biased negative by the output "Q" of flip-flop J to which the collector I*e* is connected. When the inverter I is thus turned ON, the flip-flop J will be set and will ground the emitter L*e* of another inverter L. The base L*b* of the inverter L is connected to a clock pulse amplifier, so that when it is properly biased by the flip-flop J, the next ensuing clock pulse P1101 will turn ON the inverter L, thereby grounding its collector L*c*, connected to a pulse amplifier M from which an amplified control pulse P*c* will pass to the connected computer circuitry. This pulse P*c* also is impressed on the base N*b* of inverter N and on the base S*b* of inverter S. The emitter of each of these inverters is grounded so that the impression of the control pulse P*c* on the base thereof turns both inverter ON, thus grounding both collectors N*c* and S*c* which resets the flip-flops J and E, placing both "0's" of the flip-flops at —3 volts and ready for the next scan cycle.

Figure 11B:
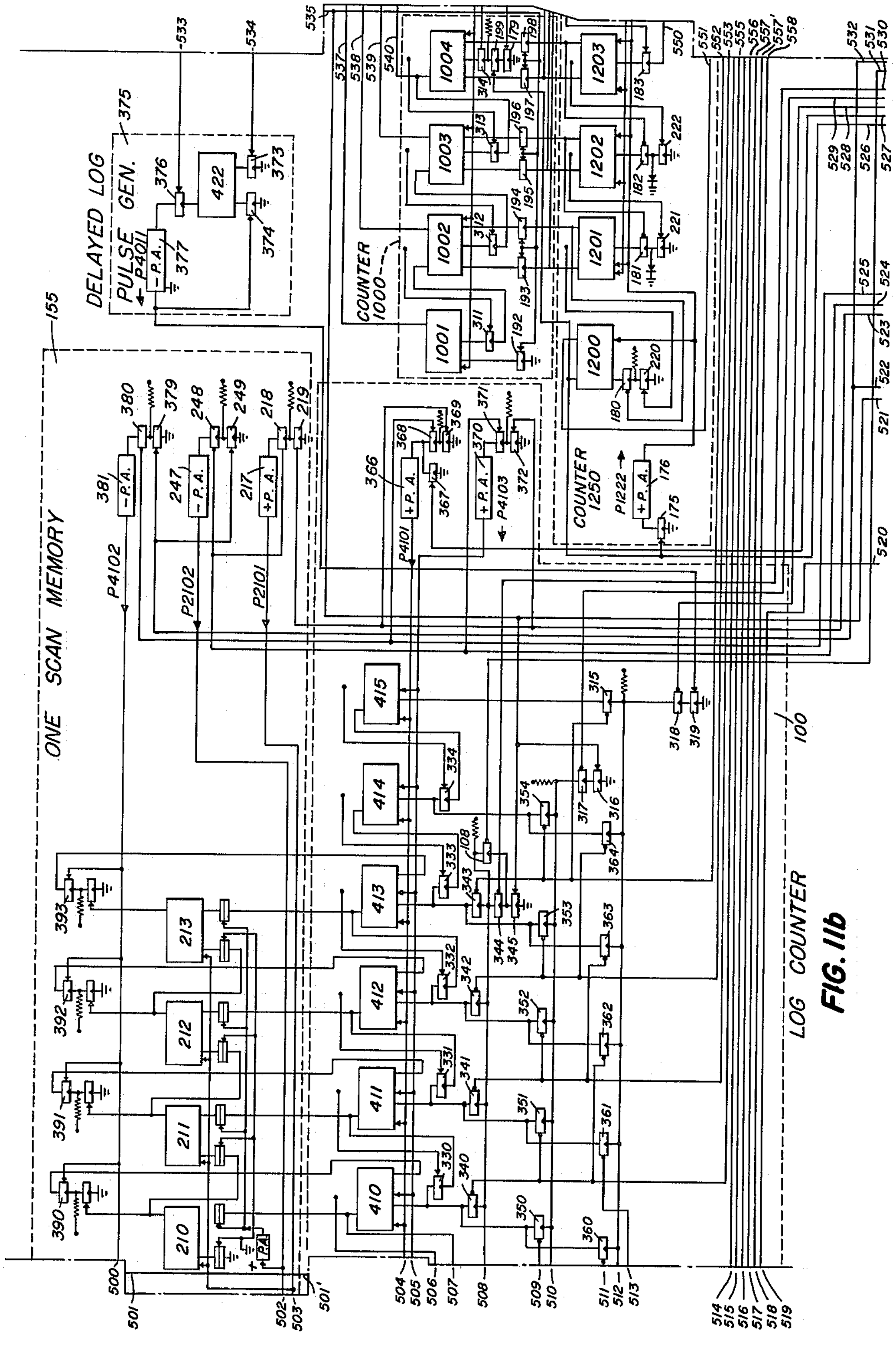
Figure 11C:
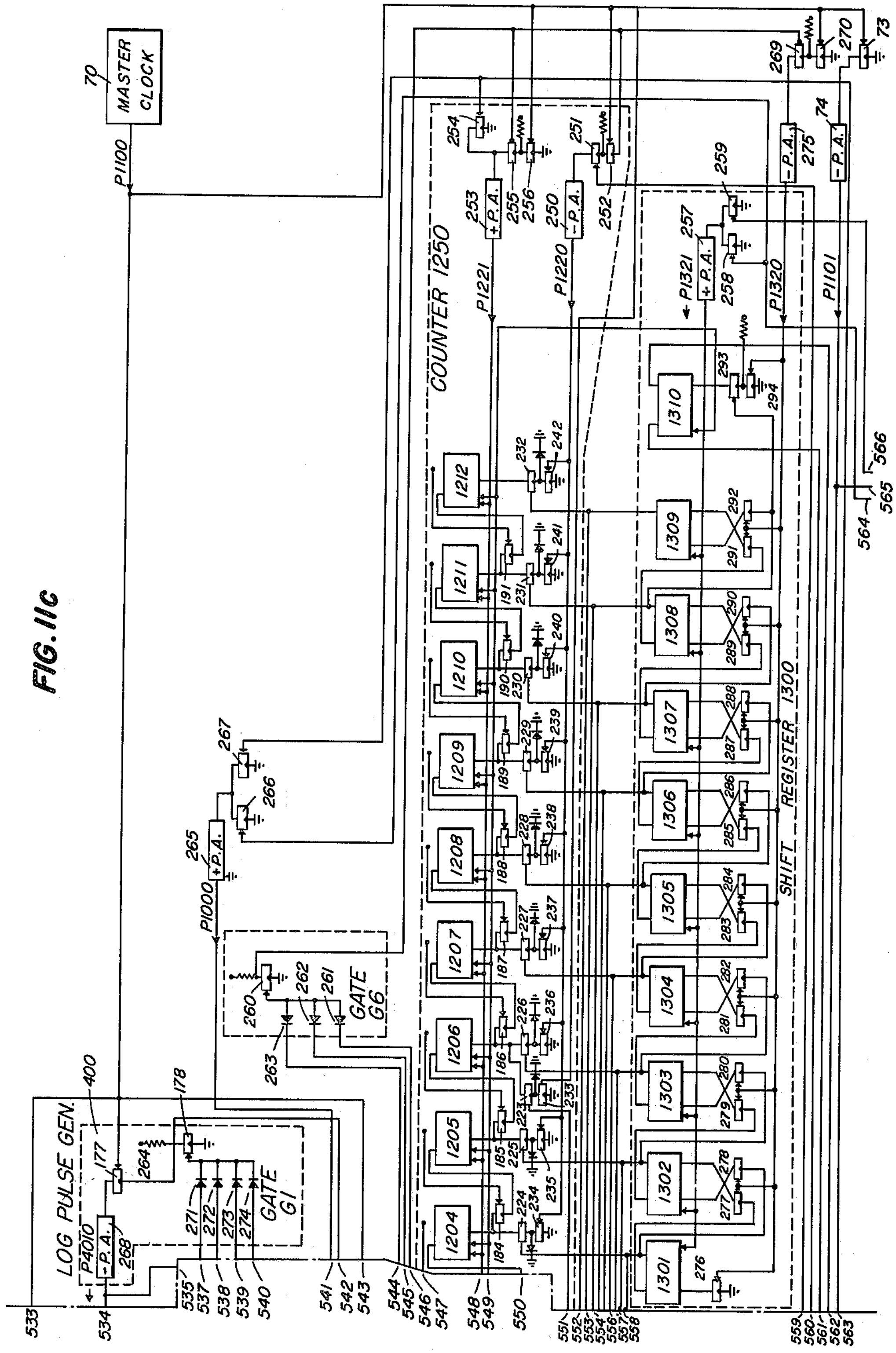
Figure 11D:
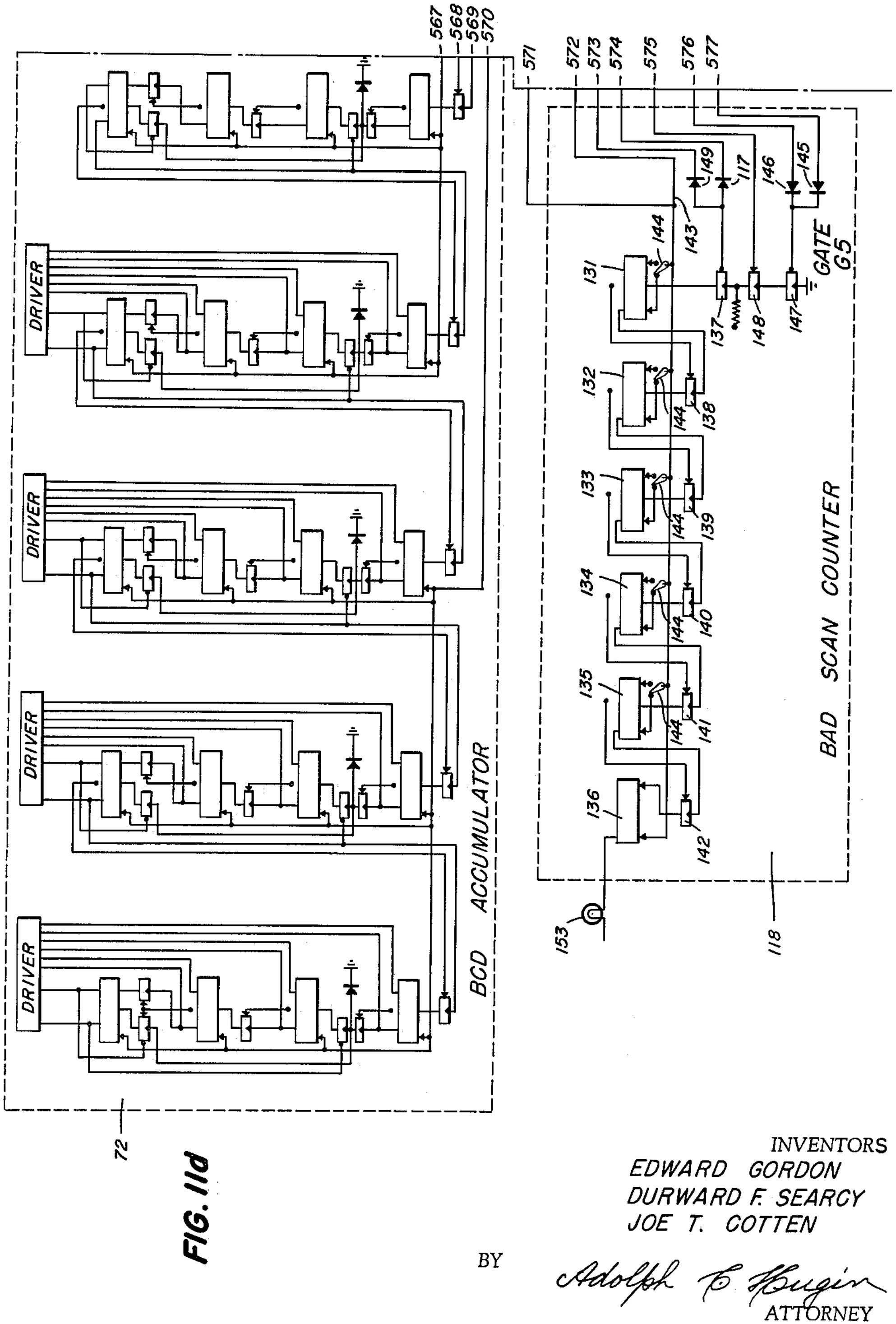
Figure 11E:
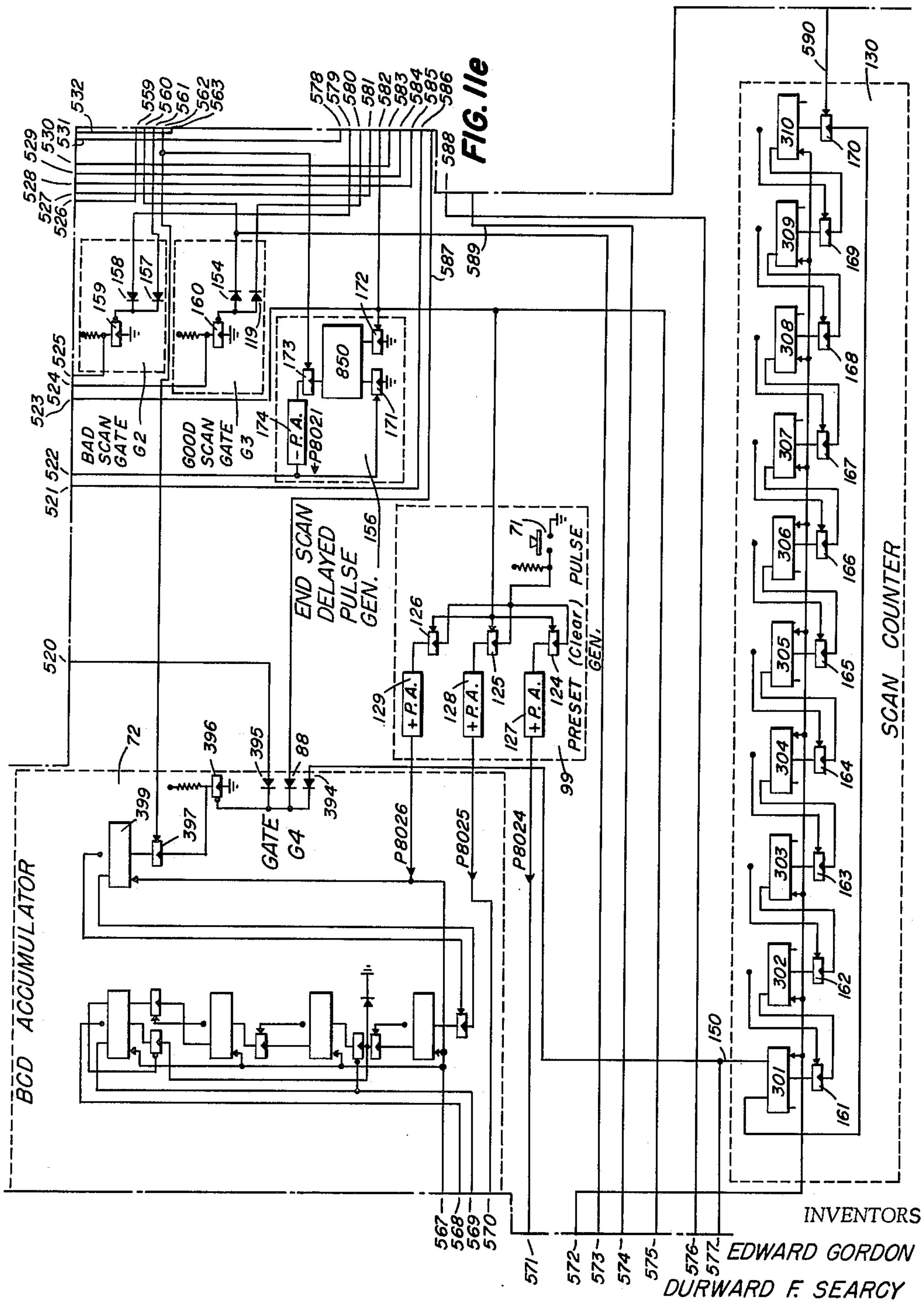
Figure 11F:
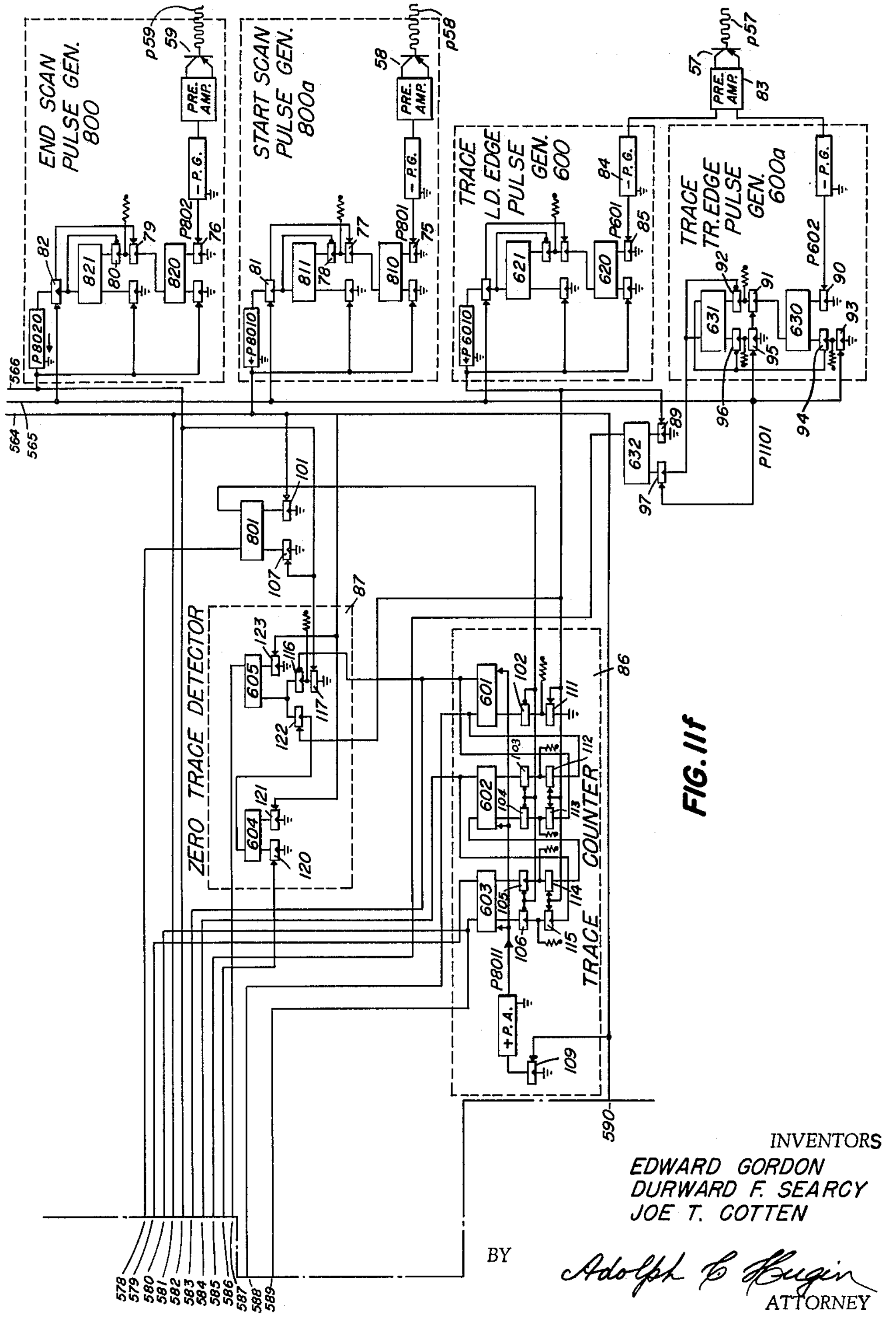

Referring to FIG 11*f*, the "start scan" and "end scan" optical signals *p58* and *p59*, respectively, are sensed by the scan control pulse generators 58 and 59, and, as explained, are amplified by pre-amplifiers and pulse generators, which emit pulses P801 and P802. These turn ON inverters 75 and 76, so as to set flip-flops 810 and 820, which, as explained, will provide for the next amplified clock pulse P1101 to turn ON the sets of inverters 77–78 and 79–80, so as to set the flip-flops 811 and 821, which will allow the next clock pulse P1101 to turn ON the inverters 81 and 82. These will cause respectively associated pulse amplifiers to emit "start scan" and "end scan" control pulses P8010 and P8020 by the "start scan" pulse generator 800 and the "end scan" pulse generator **800*a***, which pulses are fed by suitable circuitry to various components of the computer.

As has been explained, an important aspect of the present invention is a refinement in the reading of the trace records on the chart in that the valve of each trace is determined by the middle of the width of the trace rather than by either the leading edge or the trailing edge of each trace. This refinement is particularly useful where a relatively wide or "paint brush" trace forms the chart record. In order to obtain this type of control pulse to indicate the value represented by the middle of a trace, the computer scanning circuitry provides for a signal indicative of the value represented by the leading edge of a trace, which results from an optical signal passed through the scan disc slot 39 as a scan lens 46 passes over a trace and thereby receives a diminution of light reflected from the chart surface. This decrease in the light received by the scan lens provides an optical signal which is negatively amplified by a preamplifier 83 and passed to a pulse generator 84 from which a "trace leading edge" pulse P601 is emitted. This pulse P601 is impressed upon the base **85*b* of an inverter 85, which is connected in a clock pulse synchronizing circuit similar to the "start scan" and "end scan" clock synchronizing circuits, FIG. 10 type, and results in a "trace leading edge" pulse P6010 which is emitted by the "trace leading edge" pulse generator 600 and is fed by suitable circuitry to a trace counter 86 and to a gating circuit, forming part of a zero trace detector 87 including a flip-flop 605 which is adapted to impress a potential on a gate diode 88** of gate G4, FIG. 11*e*, for controlling the admission of a count to the accumulator 72 during the compute part of a cycle of operation, as explained later.

The "trace leading edge" pulse P6010 also is impressed on the base **89*b* of an inverter 89**, FIG. 11*f*, the emitter **89*e* of which is grounded and the collector 89*c* of which is connected so as to set a flip-flop 632**. This flip-flop forms part of the trace half-width correction circuitry jointly controlled with the "trace trailing edge" pulse and its synchronizing circuit.

The "trace trailing edge" synchronizing circuit functions so as to control flip-flop 632 in such a manner that it is ON only during the scan of a trace, that is, while the scanning lens is passing over a trace and so as to control flip-flop 632 so that it is OFF at all other times. The "trace leading edge" pulse P6010 sets the flip-flop 632 by grounding collector **89*c* of the inverter 89, thereby setting the "1" terminal of this flip-flop to a negative potential. In the "trace trailing edge" pulse generator 600*a*, when the pulse P602 occurs, it turns inverter 90 ON and grounds its collector 90*c* which grounds the "0" terminal of the flip-flop 630. This in turn grounds emitter 91*e* of inverter 91 so that the next amplified clock pulse P1101**:

(1) Turns ON the inverter 91 and grounds its collector **91*c* thereby grounding the emitter 92*e* of inverter 92**;

(2) is applied to base **93*b* of inverter 93 so as to turn ON this inverter and ground its collector 93*c* which in turn grounds emitter 94*e* and prepares inverter 94** to be turned ON;

(3) is impressed on base **95*b* of inverter 95 thereby grounding collector 95*c* of this inverter. This in turn grounds emitter 96*e* of inverter 96**.

Normally, the terminal "1" of flip-flop 631 is at ground potential and its "0" terminal is at a negative potential. Under condition (1) above, emitter **92*e* is at ground potential. This flips flip-flop 631 and grounds its "0" terminal thereby setting its "1" terminal to a negative potential. The grounding of the "0" terminal of flip-flop 631 grounds inverter emitter 97*e* so that the amplified clock pulse P1101 grounds collector 97*c* which in turn grounds the "1" terminal of flip-flop 632 so that this flip-flop is turned OFF. After condition (1) above has set flip-flop 631, the negative potential on its "1" terminal grounds the collector the "0" terminal of flip-flop 630 to a negative potential which impresses a negative potential on emitter 91e and thereby prevents any further change in the state of flip-flop 631 by clock pulse P1101 on inverter 91 and on inverter 92 until the next "trace trailing edge" pulse P602**.

After condition (1) above sets terminal "1" of flip-flop 631 to a negative potential, as a result of condition (3) above, collector 96c is grounded. This resets flip-flop 631 so that its "1" terminal is grounded thereby restoring it to its normal condition when the scanner is not sensing a trace. The application of the potential of terminal "1" of flip-flop 632, in controlling the half width correction, will be explained later with relation to the manner in which the signals representing log pulses are admitted into the binary log counter.

As has been explained, the measurement of the values of traces scanned on a chart by the scanning head is performed by counting the number of clock pulses occurring between specified reference points on the chart. These various reference points are controlled by the control pulses: the "end scan" pulse P8020, the "start scan" pulse P8010, the "trace leading edge" pulse P6010, and by the condition or state of the flip-flop 632 in response to the potentials impressed thereon by the "trace leading edge" pulse and the "trace trailing edge" pulse generators. In addition, the computer is arranged so that its cycle of operation is approximately evenly divided into scan cycles and alternate compute cycles. The measurements are all made from the chart during the scan cycle and the logarithmic computations also are made during this cycle of the operation. During each compute cycle of the operation, the antilog of the summation of signals representing the logarithms of values which were entered into the log counter are determined and entered into the accumulator 72. Provision is made to prevent interference between the two independent alternate cycles comprising the scanning and measurement cycle and the compute cycle. A relatively simple flip-flop gate is used to accomplish this result. This gate comprises flip-flop 801 and its immediate control inverters.

*Gate flip-flop 801*

Flip-flop 801 is used as a control gate for the trace counter 86 and the log counter 100. It allows (1) the trace counter 86 to operate only during the actual optical scanning cycle, and allows (2) entry of log pulses into the log counter during the compute cycle when the antilog is being determined.

Condition (1) exists when a "start scan" pulse P8010 is impressed on the inverter base 101b thereby grounding the inverter collector 101c which sets the "1" terminal of flip-flop 801 to a negative potential. This impresses a negative potential on the trace counter inverter bases 102b, 103b, 104b, 105b, and 106b so as to preset the inverters 102, 103, 104, 105, and 106 for turning ON any of these inverters when its emitter is grounded. Grounding of the emitter of any of these inverters is done by pulsing it in response to an initiating "trace leading edge" pulse P6010. Since these five inverters are progressively connected to flip-flops 601 and 602 of the trace counter, they will only be pulsed in accordance with the number of traces which have been counted by the counter 86.

When "end scan" pulse P8020 is impressed on the base of inverter 107 thereby grounding the collector of this inverter, flip-flop 801 is reset so that its "1" terminal is grounded. This, in turn, grounds the bases of the trace counter inverters 102, 103, 104, 105, and 106 which were preset through flip-flop 801 by the "start scan" pulse P8010. This prevents any further count from entering into the trace counter until these inverters are again preset by a new "start scan" pulse P8010, as explained above.

Under the first condition mentioned above, when a "start scan" pulse P8010 has been impressed on the base of the inverter 101 thereby setting the "0" terminal of flip-flop 801 to ground potential, this ground potential is impressed on the base of inverter 108 in the log counter 100, FIG. 11*b*, thus preventing entry of a count into the log counter by this path during a scan cycle.

When, as previously stated, an "end scan" pulse P8020 is impressed on the base of inverter 107, the "0" terminal of the flip-flop 801 is placed at a negative potential. This negative potential is impressed on the base of the log counter inverter 108 thereby presetting it for the transmittal of log pulses into the log counter. In this manner, the flip-flop 801 and its associated inverters 101 and 107 function as a gate to provide the desired control of the log counter and the trace counter during the scanning and compute cycles.

*Trace counter*

An accurate count of the traces during each scan of a chart is very important in order to determine which scans are good scans and are to be used in obtaining the integrated result of the computations. Since each alternate part of each complete operating cycle is a compute cycle during which no scanning is performed, provision is made to make the trace counter 86 operative to count traces only during scan cycles. This control is provided by the presetting of the inverters 102–106 thereof by the gate flip-flop 801. In addition, a "start scan" pulse P8010 is adapted to reset the trace counter 86 by turning ON an inverter 109 which grounds the input to a pulse amplifier 110. This produces a resetting positive potential pulse P8011 to preset flip-flops 601, 602, and 603 which are connected together as a shift register in which the preset by P8011 places the "1" terminal of flip-flop 601 and the "0" terminals of flip-flops 602 and 603 at a negative potential.

(a) Under this preset condition, when the first "trace leading edge" pulse P6010 is impressed on the trace counter inverters 111, 112, 113, 114, and 115, and flip-flop 801 set for counting traces, the pulse P6010 on the inverter base 111b grounds the inverter emitter 102, which grounds the "reset" input of flip-flop 601 and resets the "1" terminal of flip-flop 601 to ground and its "0" terminal to a negative potential.

(b) Simultaneously, since inverter emitter 112e was grounded, pulse P6010 grounds inverter collector 112c, which grounds inverter emitter 103e, which grounds its collector 103c, which grounds the "set" input to flip-flop 602 and sets its "1" terminal to a negative potential and its "0" terminal to ground.

(c) Also, simultaneously, nothing was affected by inverter 113, since its emitter was at the negative potential of the "1" terminal of flip-flop 601.

(d) Further, since inverter emitter 114e was at the negative potential of the "0" terminal of flip-flop 602, nothing was affected by inverter 114 at this time.

(e) Also, inverter emitter 115e was at the ground potential of the "1" terminal of flip-flop 602, so that pulse P6010 turned ON inverter 115, grounding its collector, which grounded inverter emitter 106e, turning ON inverter 106 and grounding the reset input to flip-flop 603. This left flip-flop 603 terminal "0" negative and its terminal "1" grounded.

Condition (a) above, makes inverter emitter 112 negative, which shuts OFF the set input to flip-flop 602; while the ground on the "1" terminal of flip-flop 601 grounds inverter emitter 113e and presets it to pass the next pulse on inverter base 113b.

Condition (b) above, in similar manner, makes inverter emitter 115e negative and shuts OFF the reset input to flip-flop 603, while the ground of the "0" terminal of flip-flop 602 on inverter emitter 114e presets it to pass the next pulse on inverter base 114b.

Condition (a) also impressed the ground potential of terminal "1" of flip-flop 601 on a zero trace detector inverter base 116b, which prevents grounding of the reset input to flip-flop 605 through inverter 117 by an "end scan" pulse P8020 because a trace has been scanned.

A second "trace leading edge" pulse P6010 will leave the flip-flop 601 terminal "0" negative, and will make the "0" terminal of flip-flop 602 and the "1" terminal of flip-flop 603 negative, as in any conventional shift register. Such a second pulse P6010 on the inverter 115 base grounds its collector which grounds the inverter 106 emitter. In turn, this grounds collector 106*c* which grounds the reset input of flip-flop 601. This leaves its "0" terminal negative, so that inverter emitter 112*e* is negative, and this second pulse P6010 is ineffective on inverter 112. It does, however, ground inverter collector 113*c*, which grounds inverter emitter 104*e*, grounding its collector and the reset input to flip-flop 602. This grounds the "1" terminal of flip-flop 602 and resets its "0" terminal negative. This second pulse P6010 also grounds inverter collector 114*c* which grounds inverter emitter 105*e* and, therefore, its collector 105*c*. This grounds the set input to flip-flop 603 which sets its "1" terminal negative.

Any further "trace leading edge" pulse P6010 will leave the "0" terminals of flip-flops 601 and 602 negative and reset the "0" terminal of flip-flop 603 negative, as in any conventional shift register. Such a third pulse P6010 on inverter base 111*b* leaves the "0" terminal of flip-flop 601 negative as before. It also is ineffective on inverter 112 and grounds inverter collector 113*c*, which, as before, grounds the "1" terminal of flip-flop 602, and leaves its "0" terminal negative. Further, it is ineffective on inverter 114 and grounds inverter collector 115*c*, which grounds inverter emitter 106*e*, and consequently collector 106*c*. This grounds the reset input to flip-flop 603, which rests its "0" terminal negative.

This indicates a bad scan in that there has been sensed more than the desired two traces. It impresses a negative potential on diode 117 of gate G5 in the bad scan counter 118, FIG. 11*d*, and on diode 119 of gate G3, FIG. 11*e*.

Another condition indicating a bad scan is the absence of any traces. A zero trace detector 87 is provided to determine this condition and provide the controls necessary to minimize its effects on the integrated result of the computations.

*Zero trace detector*

The zero trace detector 87, FIG. 11*f*, is used to prevent entry of count into the accumulator 72 when either:

(1) there is no trace in any complete scan; or (2) when either trace is near zero, because it would be very difficult or impossible to determine an accurate logarithm of the value, no entry is made into the accumulator.

This unit comprises two flip-flops 604 and 605 and respectively associated sets of inverters 120 and 121, and 116, 117, 122, and 123.

In this arrangement, when a "start scan" pulse P8010 is impressed on inverter base 123*b*, it is turned ON and sets flip-flop 605, producing a negative potential at its "1" terminal, which is impressed on diode 88 of gate G4 in the accumulator 72, FIG. 11*e*.

(1) When, subsequently an "end scan" pulse P8020 occurs, it is impressed on inverter base 117*b*, thereby grounding inverter emitter 116*e*, so that if trace counter flip-flop 601 is set (its "1" terminal negative) indicating absence of any trace during the scan (see trace counter) and, therefore, inverter base 116*b* is negative, the inverter is turned ON and flip-flop 605 reset input is grounded. This resets flip-flop 605 terminal "1" to ground potential, which grounds diode 88 of gate G4 and prevents entry of count into accumulator 72.

(2) When a "start scan" pulse P8010 occurs, it also is impressed on the grounded emitter inverter base 121*b*, which turns it ON and grounds flip-flop 604 set input, thereby setting its "0" terminal to ground. This in turn grounds inverter emitter 122*e*, so that the occurrence of a "trace leading edge" pulse P6010 grounds inverter collector 122*c*, thereby resetting flip-flop 605 terminal "1" to ground. As previously explained, this places ground potential on diode 88 of gate G4 and prevents entry of count into the accumulator. This can occur only if a "trace leading edge" pulse occurs before the first log pulse P4010. This latter occurs slightly after the "zero" count and is impressed on inverter base 120*b*, grounding the inverter collector 120*c* and the reset input to flip-flop 604, thus flipping it and placing its "0" terminal at negative potential. With such a sequence of pulses; that is, with the first log pulse P4010 occurring before a "trace leading edge" pulse P6010, the negative potential thus impressed on inverter emitter 122*e* prevents grounding its collector 122*c* by a "trace leading edge" pulse P6010. This leaves flip-flop 605 terminal "1" set negtaive and does not prevent entry of count into the accumulator.

In addition to detecting the presence of the wrong number of traces during a scan and substituting an approximation in the accumulator for such a bad scan count, the bad scan counter 118 is provided to facilitate taking further corrective measures when more than a predetermined number of bad scans occur during any one chart computation. A further prerequisite to a usable integrated computation is that the various counters providing the integration and the scan counts start their respective counts at zero and correlate these counts to that of a complete scan. These initiating conditions may conveniently be established by a preset or "clear" pulse generator 99 and its connection to suitable gating and clearing components.

*Preset (clear) pulse generator*

When it is desired to start a computation for obtaining a final result, the "start" or "clear" button 71 of a preset or "clear" pulse generator 99 is depressed and grounds inverter emitters 124*e*, 125*e*, and 126*e*, which provides for grounding the inverter collectors 124*c*, 125*c*, and 126*c* on the occurrence of the next "end scan" pulse P8020. This triggers three pulse amplifiers 127, 128, and 129, connected respectively to the inverters 124, 125, and 126, and produces "clear" pulses P8024, P8025, and P8026. The "end scan" pulse is used as the initiating pulse because it assures the availability of a full scan cycle result for the first entry. Also, three pulse amplifiers are used simply to assure an adequate source of pulsing energy.

"Clear" pulse P8024 is used to preset the bad scan counter 118, FIG. 11*d*, and a scan counter 130, FIG. 11*e*, and "clear" pulses P8025 and P8026 each clears or presets half of the accumulator 72.

*Bad scan counter*

The bad scan counter 118 may comprise any suitable counter, illustrated as a conventional straight binary counter, with a gate G5 for determining the presence of a count due to a bad scan and switching connections to provide for a choice of the number of bad scans which will be acceptable before a signal is given to alert the existence of the maximum allowable bad scans.

As shown, the binary counter comprises six complementing flip-flops 131, 132, 133, 134, 135, and 136, and is of the type described in "DEC Building Block Logic," pages 18 and 19. The first five of these are adapted to receive a pulse to be counted respectively through inverters 137, 138, 139, 140, and 141 connected to the complement inputs thereof. A control inverter 142 is connected between the fifth flip-flop 135 and the last flip-flop 136, but its collector 142*c* is connected to the set input instead of the complement input. This assures against change of the output of this last flip-flop after a maximum count has been detected. Resetting of all six of the flip-flops is done when the clear button 71 is closed by impressing a clear pulse P8024 on the reset inputs of the flip-flops. In order to allow a selection of the acceptable number of bad scans counted before a signal is given, the reset inputs of the first five flip-flops are connected to the resetting line 143 by manually operable switches 144. Thus, it is only necessary to preset the desired number of switches 144 to provide for reset of the corresponding counting flip-flops and to close the others so as to set the associated flip-flops whereby any signal received by a set flip-flop is simply passed along without effect on such flip-flop.

Furthermore, the count of bad scans is controlled by the gate G5 which determines when a count is to enter the counter. This gate G5 comprises diodes 145 and 146 connected as an "and" gate to a grounded emitter inverter base 147*b*, an inverter 148 adapted to be turned ON by an "end scan" pulse P8020 when the "and" gate is closed, and an "or" gate formed by diodes 117 and 149.

(a) Bad scans are only to be counted during actual scanning of a chart. This requires that the count in the scan counter 130 be less than a full count for a complete computation, that is, in this instance, be less than 400 scans. This is indicated by a negative potential on the output terminal 150 of the scan counter 130. This potential is impressed on diode 145 of gate G5.

(b) Also, if no trace has been sensed, it is a good scan. A bad scan, therefore, requires that at least one trace have been sensed, that is, that the trace counter flip-flop 601 not be set ("0" terminal be negative). This potential is impressed on diode 146 of gate G5.

If both (a) and (b) conditions give negative potentials on diodes 145 and 146, it indicates an incorrect number of traces during a scan, and these diodes function as an "and" gate and impress a negative potential on inverter base 147*b*.

(c) This grounds inverter emitter 148*e*, so that the next "end scan" pulse P8020 will turn ON inverter 148. This latter inverter assures that a full scan has been made before the trace count is considered by the gate in allowing entry of a bad scan count into the counter.

(d) Also, if other than two traces have been sensed, it is a bad scan. This is indicated if the trace counter flip-flop 603, FIG. 11*f*, is not set, i.e., its "0" terminal is negative. This potential is impressed on diode 117 of gate G5.

(e) Further, unless the last shift was made in a shift register 151, FIG. 11*e*, the generation of the count by a log pulse generator 152 is improper in accordance with the counting method employed. This is indicated by the last flip-flop 1310 in the shift register 151 not being set, i.e., its "0" terminal is negative. This potential is impressed on diode 149 of gate G5.

If either condition (d) or (e) is present, it is a bad scan, and diodes 117 and 149 function as an "or" gate and impress a negative potential on inverter base 137*b*. This turns ON inverter 137 and enters a count into flip-flop 131. This happens only when all conditions of gate G5 are satisfied, that is:

(a) count must be made during actual scanning of chart, and
(b) at least one trace must have been sensed,
(c) scan must have ended, and
(d) either other than two traces were sensed, or
(e) log pulse generation was improper.

If the preselected number of bad scans are counted, the ground potential resulting on the "0" terminal of flip-flop 136 is impressed on any suitable signal device, such as a red light 153, to warn an operator not to use or rely upon the integrated result obtained from the chart on which the result is based.

*Scan counter*

The scan counter 130, FIG. 11*e*, is for the purpose of counting the scans made during one complete chart calculation and emitting a signal (pulse or potential) impressed on both the accumulator 72 and the bad scan counter 118 through gates G4 and G5 thereof, respectively in order to stop the entry of computations therein at this point.

The electrical and mechanical drives of the scanner and the chart turntable 36 are constructed and synchronized to provide 400 scans per revolution of the chart turntable 36. The scan counter 130 comprises ten flip-flop units, including flip-flops 301–310 with complementing inverters 161–170 and carry pulse circuits for the first nine flip-flops. A preset circuit, energized by a preset pulse P8024 emitted by the preset pulse generator 99 when the operation initiating clear button 71 is closed, assures an accurate count for each complete chart calculation.

The "0" terminal of each flip-flop is connected to the next higher flip-flop complementing inverter emitter and its carry pulse terminal to the same inverter base. The unit is built so that the carry pulse series connection and propagate time is much less than the flip-flop's total transition time. This insures that the "1" and "0" output terminals will not change until after the carry pulse has been gated to the next inverter base. Thus, whenever a flip-flop is in the "0" state, the complementing inverter of the next flip-flop is prevented from complementing this next flip-flop by a carry pulse from the "0" state flip-flop and provides a very simple type straight binary counter.

Since the ten flip-flops of the scan counter would require a count of 512 completely to fill it as a straight counter, whereas it is required to emit a signal on the 400th scan, provision is made to preset it to an initial count of 112, i.e. the complement of 400. This is done by applying a preset plus potential pulse P8024 to the set input terminals of flip-flops 306, 305, 304, and 301 and to the reset input terminals of flip-flops 310, 309, 308, 307, 303, and 302. Thus, the preset pulse P8024 sets the "0" terminal of flip-flop 301 to ground potential which grounds inverter emitter 170*e*. This allows a "start scan" pulse P8010 to complement flip-flop 310 and ground its "0" terminal. Count then progresses to 400, at which time the count pulses flip-flop 301 after having bypassed flip-flops 306, 305, and 304 without counting their values.

When flip-flop 310 is complemented to its reset, "0" condition, it inhibits further entry of counts by impressing a negative potential on inverter emitter 170*e*. When thus reset, it also applies ground potential to diode 145 of gate G5 in the bad scan counter 118 for the purposes previously described under "Bad Scan Counter" (a) and to a diode 394 of gate G4 for the purpose to be explained under "Compute Cycle Operation."

*General operation*

At the start of the reading of a chart, the chart 35 must be in a proper position on its turntable 36 and the clear button 71 must be depressed sufficiently long to allow an "end scan" pulse P8020 to occur in order to assure that the first computation will be made from one full scan cycle of the chart. When such an "end scan" pulse occurs with the clear button 71 closed, preset pulses P8024, P8025, and P8026 are generated and emitted by the preset pulse generator 99. The preset pulse P8024 presets the scan counter to the binary equivalent of the number 112 so that, when 400 "start scan" pulses P8010 have been counted, flip-flop 301 of the scan counter will have its condition changed and a negative potential, FIG. 11*e*, will appear on the terminal 150 of the scan counter indicating that the reading of the chart has been completed.

Preset pulse P8024 also presets the bad scan counter 118 to the value selected by the operator and indicated by the switches 144 which are closed. Preset pulses P8025 and P8026 clear the accumulator 72 and reset it to a binary zero condition.

The computation progresses by an alternate series of scanned cycles and compute cycles. Certain of the scan cycles might, for several reasons, as has been explained, provide results which would give an inaccurate final summation. Such ban scan cycles are detected and the computations therefrom are not entered into the accumulator 72. If a scan cycle immediately preceding an "end scan" pulse P8020 was a good scan, a complementing pulse P4103 is generated and impressed on the log counter 100 so as to complement the count in the log counter and a clear pulse P2101 is generated and impressed on the one scan memory 155 so as to clear the memory. A "delayed end scan" pulse P8021 is generated by a delayed end scan pulse generator 156 in order to provide time for the complementing of the log counter and the clearing of the memory. This generator then emits a "delayed end scan" pulse P8021 which, through suitable controls and a pulse amplifier, generates a "jamming" pulse P2102 which is impressed on the cleared memory 155 and jam transfers the complemented log count in the log counter 100 into the memory 155.

If a scan cycle indicates a bad scan, as has previously been explained, a "clear" pulse P4101 is generated and impressed on a log counter so as to clear the content thereof and a "jamming" pulse P4102 is generated and impressed on the memory 155 so as to jam transfer the content of the memory, which corresponds to the complement of the count of the last prior good scan entered in the log counter, into the log counter 100.

A compute cycle then is executed, and amplified clock pulses P1101 are entered into the accumulator 72 corresponding to the antilog of the content of the log counter at the time that the "end scan" pulse P8020 occurred, if the scan was a good scan, or corresponding to the value in the log counter transferred thereto from the memory, if the last scan was a bad scan. As has been explained, when the 400th "start scan" pulse has been counted, the reading of the chart is completed and a negative potential is impressed on the "and" gate G4 of the accumulator, thereby cutting off the entry of further count thereinto and giving the final integrated result of a complete reading of the chart.

*Good scan and bad scan gates*

Two gates are utilized for providing special pulses to the log counter 100 and the memory 155 to control the interchange of counts therebetween and the transfer of the counts therefrom to other components of the computer. These gates may comprise any suitable gating circuit, one of which, such as gate G2, is responsive to bad scans and the other of which, such as gate G3, is responsive to good scans.

The illustrated bad scan gate G2 comprises two diodes 157 and 158, which function as an "or" gate connected to an inverter 159. It is adapted to impress ground potential on inverter base **159*b*** when:

(a) other than two traces are sensed, as indicated by ground potential on the trace counter flip-flop 603 terminal "1" which is impressed on diode 158, or (b) an incorrect count has been made as indicated by ground potential on shift register flip-flop 1310 terminal "1" which is impressed on diode 157. This latter condition, as previously explained, exists when less than eight shifts have been made in the shift register 1300.

If either (a) or (b) exists, gate G2 inverter base **159*b* is grounded, so that its collector 159*c* is clamped to a negative potential, thereby giving gate G2** a negative output on occurrence of a bad scan.

The illustrated good scan gate G3 comprises two diodes 119 and 154, which function as an "and" gate connected to an inverter 160. It is adapted to impress ground potential on inverter base **160*b*** when:

(c) two and only two traces have been sensed, as indicated by ground potential on the trace counter flip-flop 603 terminal "0," which is impressed on diode 119, and (d) that a correct count is indicated by a full shift in the shift register 1300 which results in grounding of the "0" terminal of its flip-flop 1310 (flip-flop 1310 is "on" at end of scan) and impressing ground potential on diode 154.

If both (c) and (d) exist, gate G3 inverter base **160*b* is grounded, so that its negative load clamped collector 160*c* is at negative potential, thereby giving gate G3** a negative output on occurrence of a good scan.

*Basic considerations for counters*

In order to use the technique of logarithms for determining the $\sqrt{hP}$, as previously explained, the logs of these values must be determined, added, halved, and the antilog of the result found. The equation can be variously expressed as already shown, and the proper addition and halving of the counts can readily be done in a suitable binary counter, with several entry points.

In the illustrated computer, sufficient resolution is obtained within each log unit by successively reducing the number of increments in successively smaller log units by half and correspondingly giving each increment in the respective unit twice the weighted value of increments in the next larger unit. This provides essentially uniform resolution throughout the chart scale.

Since a binary counter must count integral numbers of pulses, the smallest number of increments in a log unit which can be counted is one. This single increment unit will, therefore, be weighted the highest. Accordingly, successive binary entry points are used for each successive log unit, with the smallest unit counts entered into the highest value or weight entry point. Using this system, the largest log unit conveniently should be divided into a number of increments which is a power of two.

Also, since the smallest log unit has but one increment, and the total number of log units is known, the binary entry point of the smallest unit is the counting unit which has the same significance in the counter as the weight of the increment of this log unit. It then is simply only necessary to shift to the next less significant binary counting unit for the entry point of the counter of increments (log pulses) from the next lower weighted log unit in order to give the increments (log pulses) the necessary weight by the binary counter to obtain a correct count of the log of the linear value of the trace being measured.

A log conversion or generation system is provided for electronically producing log pulses corresponding to the log increments of the trace or other linear values being measured, which log pulses (increments) are then entered in the binary log counter, according to the weight previously assigned to the respective log unit or area of the chart being scanned at the time. The use of this weighted increment system gives the same result in using a binary counter as carrying the same resolution through all log units and entering one pulse in the first counting unit, or two pulses in the eighth, or four pulses in the 16th, etc. Accordingly, for a scan of eight log units but less than nine, the first log pulses should theoretically be entered in the counting unit having a count value of 256, then two log pulses in the counting unit where each pulse has a count value of 128, then four pulses each having a count value of 64, then eight pulses each having a count value of 32, etc.

This conversion from linearly measured values by clock pulses into increments or log pulses to be entered into the log counter as weighted values includes the proper connection of the initial clock pulse binary counter, a second binary counter, a shift register and shift gate, and a log pulse gate and generator, together with proper interconnections and gates. Certain additional modifying components, especially for preventing possible interference by concurrent application of different pulses or potentials which might result in inaccuracies, are provided. These generally are in the nature of delayed pulses which have sufficient time for proper entry.

*End scan delayed pulse generator*

For certain controls, it is desirable to have an "end scan" pulse which is delayed one clock pulse, especially in connection with the log pulses, all of which require a number of clock pulses for generation, up to 14 clock pulses, so that a delay of one clock pulse affords more than enough time for carrying out certain functions which are responsive to an "end scan" pulse. This is used only where necessary to avoid possible interference with other pulses.

An end scan delayed pulse generator 156 comprising a flip-flop 850, with input inverters 171 and 172 and an output inverter 173, connected to a suitable pulse amplifier 174, FIG. 11*e*, illustrates a practical component for giving the desired control delay. In this generator, an "end scan" pulse P8020 is impressed on inverter emitter base 172*b* and sets flip-flop 850, which grounds its "0" output. This grounds inverter emitter 173*e*, and the next ensuing clock pulse P1101 turns ON inverter 173, which triggers the pulse amplifier 174 so that it emits an "end scan delayed" pulse P8021, delayed one clock pulse from its initiating "end scan" pulse P8020. It is readily seen that the clock pulse P1100 which generated the "end scan" pulse P8020 which turned ON inverter 172 was the clock pulse immediately preceding the one which turned ON inverter 173 and thereby triggered pulse amplifier 174 and generated the "end scan delayed" pulse P8021.

The "end scan delayed" pulse P8021 is fed back through inverter 171, so as to reset flip-flop 850, thereby allowing only one pulse P8021 to be emitted for each "end scan" pulse P8020.

*Log pulse generation delay*

As it has been explained, it is desirable to start scanning a chart below the zero reference base so as to provide for counting a trace which occurs at or slightly below this reference base. In order to assure a correct measurement of the values represented by the traces, it is desirable that provision be made to avoid including the count represented by the prezero portion of the scan.

This can conveniently be done by a special control for removing the measurement of these counts from the counter which enters into the actual computations made by the computer. In the illustrated embodiment, this may be accomplished by applying a "start scan" pulse P8010 to an inverter base 175*b* in a counter 1250, FIGS. 11*b* and 11*c*, so as to generate an amplified presetting pulse P1222 by pulse amplifier 176. This presetting pulse P1222 is applied to flip-flops 1200–1212 of counter 1250 which is a conventional straight binary counter, such as that described in "DEC Building Block Logic," copyright 1960 by Digital Equipment Corporation, pages 18 and 19; this presets the flip-flops in a manner which will compensate for the prezero counting and allows for starting a scan at a predetermined value below zero, yet near enough to the zero reference base to avoid sensing extraneous writings which may appear on the chart. For any set of charts, it usually will be possible to predetermine the percentage of full scale below the zero reference base which should be included in the scanning, and the start scan pulse generator 58 can be adjusted in its slot 60 to provide for this desired prezero scanning. When this percentage of full scale prezero scanning has been determined, the entry of the presetting pulse P1222 into the counter 1250 flip-flops 1200–1212 needed to reach zero in the scanning count is readily determinable. In the illustrated counter the prezero setting of the flip-flops is adapted to allow a count of 39 clock pulses before reaching the zero reference base so that the 40th clock pulse complements all of the flip-flops originally preset by the pulse P1222 in the counter 1250. This presetting of the flip-flops 1200–1212 could be of any convenient number to allow for the initial 39 counts and use of the 40th counter to reset all of the flip-flops in count 1250 and thereby place it in condition for entry of an accurate measurement of the value represented by the traces on the chart.

Since a count of 39 will require at least six flip-flops, counter 1250 may conveniently be used for the prezero count entry by setting flip-flops 1201–1206 to a count of 24 and using flip-flop 1206 as the entry point for the prezero count. As shown, pulse amplifier 176 is connected to flip-flops 1201–1206 to give this prezero count of 24 and is connected so as to reset flip-flops 1207–1212. In addition, pulse amplifier 176 is connected to flip-flop 1200 so as to set this flip-flop. As in all linear counts made by the present computer, the prezero count is adapted to be made by clock pulses P1100 from the master clock 70. These pulses are applied to inverter base 233*b* which turns ON inverter 233 and grounds the emitter of inverter 223, the collector of which is connected to the complementing input of flip-flop 1206. Clock pulses are inhibited from entering flip-flop 1206 until inverter base 223*b* is placed at a negative potential. This occurs when prezero setting pulse P1222 sets flip-flop 1200, thereby placing its "1" output terminal at a negative potential. This terminal of flip-flop 1200 is connected to inverter base 223*b* and therefore turns it ON and thereby allows clock pulses P1100 to enter the complementing input of flip-flop 1206. This complementing flip-flop is connected in the usual manner through inverter 185 to the complementing input of flip-flop 1205 which, in turn, is connected through inverter 184 to the complementing input of flip-flop 1204 and the remaining flip-flops 1200–1203 are interconnected through inverters 180–183 and 220–222 in the usual manner so that, when a count of 39 has been entered through flip-flop 1206, all of the flip-flops 1201–1206 will have been reset and the 40*th* clock pulse count will also reset flip-flop 1200. This impresses ground potential on inverter base 223*b* and turns OFF this inverter, thereby preventing any further clock pulses from passing into flip-flop 1206 and stops the prezero counting. This is the time at which the scan lens should be passing over the zero reference base of the chart. At this time, counter 1250 is placed in its complete reset state and is ready to start an accurate count of the values represented by the traces on the chart.

As previously explained, it has been found that the conventional orifice meter chart can be read to at least the accuracy of the recording by a scanning head of the type illustrated in FIGS. 5 and 6, where the ordinates of the chart comprise at least eight units each of which progressively extends over twice the length of the preceding unit and is divided into twice as many subdivisions, each subdivision having substantially half the value or weight of the sudbivisions in the next smaller unit. In the illustrated computer, these subdivisions comprise clock pulses P1100. As a result of thus dividing the ordinates into at least eight units, the subdivisions of which have progressively twice the value of the last preceding lower subdivisions, the counter 1250 is constructed so as to admit counts into flip-flops weighted in accordance with the relative weight or value of the subdivisions in the unit being scanned by the scanning head of the computer. In order to assure entry of the count into the proper flip-flop of counter 1250, a shift register 1300 is provided which progressively advances the entry point of the count in accordance with the unit of the chart being scanned. This shift register may be of any suitable type and comprises flip-flops 1301–1310 and respectively associated inverters which control the operation of the flip-flops. In addition, the flip-flops of the shift register are adapted to be preset by a pulse P1321 which is generated in response to the occurrence of either a "start scan" pulse P8010 or an "end scan" pulse P8020. The shift register presetting pulse P1321 is generated by a pulse amplifier 257 if a "start scan" pulse P8010 is impressed on the inverter base 258*b*, thereby turning on the inverter 258 and grounding the input to the pulse amplifier 257. An "end scan" pulse P8020 functions in the same manner when a scan has been completed and is impressed on inverter base 259*b* so as again to cause the pulse amplifier 257 to emit a shift register presetting pulse P1321. As shown in FIG. 11*c*, pulse amplifier 257 is connected to flip-flops 1302–1309 so as to reset these eight flip-flops on the occurrence of both a "start scan" and "end scan" pulse. Simultaneously therewith, flip-flop 1301 is preset to its "set" condition. Thus, at the start of a scan, clock pulses are inhibited from entry into counter 1250 flip-flops 1205–1212, as the flip-flops 1302–1309 are respectively connected to the bases of inverters 225–232 and place these inverter bases at ground potential, thereby shutting off the entry of clock pulses therethrough. Since the "start scan" pulse preset flip-flop 1301 through the presetting pulse P1321 to its "set" condition, a negative potential appears on inverter base 224*b* connected to the complementing input of flip-flop 1204. This places the inverter 224 in condition for being turned on when its base is grounded. Counts can, therefore, be entered into flip-flop 1204 of counter 1250 during the scanning of the first unit of a chart.

The counter 1250 flip-flops 1201, 1202, and 1203 are respectively connected to flip-flops 1002, 1003, and 1004 of counter 1000 through sets of inverters 193 and 194, 195 and 196, and 197 and 198. The three flip-flops 1201, 1202, and 1203 also have their "0" terminal connected to three diodes 261, 262, and 263 of gate G6 and form an "AND" gate which controls the operation of inverter 260 of this gate.

During the prezero counting by counter 1250, as previously mentioned, the flip-flop 1200 is set so that its zero output is at ground potential. This "0" terminal is connected to inverter base 199*b* of counter 1000, thereby turning OFF this inverter and inhibiting the entry of clock pulses P1100 into the input complementing terminal of flip-flop 1004 through inverter 179. Similarly, the ground potential of the "0" terminal of flip-flop 1200 in counter 1250 is impressed on inverter base 251*b* so as to turn OFF this inverter and inhibit the passage of clock pulses P1100 to the pulse amplifier 250, thereby preventing the emission of amplified clock pulses P1220. This prevents the application of such clock pulses on the flip-flops of counter 1250 during the prezero count.

As has been explained, as soon as the prezero count is completed, flip-flop 1200 is reset so that its "0" terminal is at a negative potential which is impressed on inverter base 251*b*, thereby conditioning the inverter 251 to permit the passage of clock pulses P1100 when the emitter of the inverter 251 is grounded. This emitter normally is at a negative potential, as it is connected to a clamped load.

It should be noted that amplified clock pulses P1220 are not emitted by the pulse amplifier 250 unless a gating inverter 252 is turned ON. This inverter is controlled by the clock pulses P1100 and also by the potential on inverter collector 260*c* of gate G6. Since inverter collector 260*c* is biased negative by a clamped load whenever the diodes 261, 262, and 263 close this gate, clock pulses P1100 are inhibited from passing through inverter 252 unless a negative potential is impressed on one of the diodes of gate G6, thereby turning ON inverter 260 which grounds inverter emitter 252*e*.

When gate G6 inverter 260 impresses a negative voltage on inverter emitter 252, it also impresses a negative potential on inverter base 255*b*. This places inverter 255 in condition to be turned ON when its emitter is grounded. Normally, its emitter is at a negative potential, as it is connected to a clamped load. However, when a clock pulse P1100 occurs, it turns ON inverter 256 which, in turn, grounds inverter emitter 255*e*, thereby permitting passage of the clock pulse to a pulse amplifier 253. This produces an amplified clock pulse P1221 which is used to reset flip-flops 1201 through 1212 of the counter 1250 before the start of a count at the zero reference base of a chart. During this resetting of counter 1250, clock pulses are inhibited from entering the counter due to the negative potential on inverter emitter 252*e*.

It must be noted that gate G6 is closed only when all three inverters 1201, 1202, and 1203 are set, and at all other times gate G6 is open and inverter base 260*b* is at a negative potential so that its collector is grounded and permits clock pulses P1100 to produce amplified clock pulses P1220 by the pulse amplifier 250. These clock pulses P1220, therefore, enter counter 1250 as long as flip-flop 1200 is OFF and count continues until such time as gate inverter base 260*b* again is at a negative potential and then, for one clock pulse, counter 1250 stops counting, while flip-flops 1201–1212 are being completely reset, as previously explained, by amplified clock pulse P1221. Counters 1000 and 1250 and shift register 1300 cooperate with a log pulse generator 400 to emit log pulses P4010 representative of the logarithms of the values measured by the scanning head and counted in counter 1250. The computer uses these log pulses P4010 to provide the signals utilized in calculating the desired square root of the product of the values represented by the two traces on a chart being scanned, and the antilog of this calculation then is entered into the accumulator 72 which integrates the calculations to provide the final desired result.

*Log pulse generator*

The log pulse P4010 is generated by a clock pulse P1100 when such a clock pulse can pass through an inverter 177. This inverter 177 normally is OFF, as its emitter is connected to inverter collector 178 and a clamped load 264. The inverter emitter 177*e* is grounded only when the output of an "and" gate G1 is negative, as this gate output is impressed on the inverter base 178*b*. The gate G1 comprises diodes 271, 272, 273, and 274, and all of these must be negative in order to produce a negative output on the inverter base 178*b*. These diodes are respectively connected to the "1" terminal of counter 1000 flip-flops 1001, 1002, and 1003, and the "0" terminal of a flip-flop 1004. Thus, gate G1 is ON and has a ground output only when counter 1000 flip-flops 1001, 1002, and 1003 are set and flip-flop 1004 is reset, that is, when the count in counter 1000 represents a value of 14.

Counter 1000 is adapted to be preset by a presetting pulse P1000 which is adapted to be generated by pulse amplifier 265 in response to either a "start scan" pulse P8010 or an "end scan delayed" pulse P8021 which, on the occurrence of a "start scan" pulse P8010, turns ON inverter 266 and the pulse passes through this inverter to the pulse amplifier 265. Similarly, when an "end scan delayed" pulse P8021 occurs, it passes through grounded inverter 267 to the pulse amplifier 265 which emits the counter 1000 presetting pulse P1000. This assures that counter 1000 will be preset to the desired value as each scan starts and that all of the count will have been entered into this counter at the end of a scan, after which it is again preset in response to the "end scan delayed" pulse P8021. Pulse P1000 presets counter 1000 flip-flop 1001 OFF and flip-flops 1002, 1003, and 1004 ON. This gives a count (0111) representative of a value of 7. In generating a log pulse representative of the value sensed by the scanning head optics as it crosses the zero reference base of the chart, flip-flop 1200 of counter 1250 goes OFF, thereby impressing a negative potential on inverter base 199*b*. This allows clock pulses P1100 to pass through inverter 179 and inverter 199 as long as the base of the latter is at a negative potential and inverter 314 is ON. This latter inverter is on when its base is at a negative potential in response to such a potential on the gate G1 inverter collector 178*c*. When these conditions exist and clock pulse P1100 enters the complementing input of counter 1000 flip-flop 1004, it initiates counting in this counter. When sufficient clock pulses have been counted so that the total count in flip-flops 1001, 1002, 1003, and 1004 is representative of the value 14, that is, after seven additional pulses have been counted, flip-flops 1001, 1002, and 1003 will be ON and flip-flop 1004 will be OFF, so that gate G1 diodes 271–274 all are negative, thereby grounding inverter collector 178*c*. This will ground inverter base 314*b* and prevent the eighth clock pulse P1100 from entering counter 1000. This also grounds gate G1 inverter emitter 177*e* in the log pulse generator and passes clock pulse P1100 to a pulse amplifier 268, which thereby emits an amplified pulse which comprises a log count pulse P4010. This is the pulse which is impressed on the log counter and forms the signal which is representative of a log count. It provides the basis for entry of signals representative of the logarithms of the linear values measured by the counters 1000 and 1250.

Log pulse P4010 also passes to inverter bases 192*b*–198*b*. This resets flip-flop 1001 "OFF," and also transfers the complement of flip-flops 1201–1203 respectively to flip-flops 1002–1004. This action is described in "DEC Building Block Logic," page 13, with reference to its FIG. 17. Resetting of flip-flop 1001 OFF grounds gate G1 inverter base 178*b*, restoring its collector 178*c* to a negative potential. This makes inverter base 314*b* negative and in condition to pass the next clock pulse P1100 while flip-flop 1200 is still OFF.

Since inverter collector 178*c* is at a negative potential, inverter base 177*c* is also negative, so that inverter 177 is OFF and prevents further clock pulses P1100 from entering pulse amplifier 268. This stops log pulses P4010 and permits only one log pulse being produced each time inverter collector 178*c* is grounded. Restoration of inverter base 314*b* to a negative potential permits clock pulses P1100 again to enter counter 1000 through flip-flop 1004 until again producing a binary count of 1110 therein. The clock pulses necessary to produce this latter state depend upon the complement entered into counter 1000 when the last previous log pulse P4010 occurred. This complemented state depends, as previously explained, upon the count in flip-flops 1201–1203.

Thus, since counter 1000 is preset to binary 0111 in flip-flops 1001–1004, its count will be binary 1110 after seven clock pulses P1100 have been entered therein. This is the count requisite to make gate G1 diodes 271–274 all negative, thereby grounding inverter collector 178*c*, allowing clock pulse P1100 to pass to pulse amplifier 268 and producing a log pulse P4010. This cycle is repeated as has been explained. The "weighting" of the clock pulses P1100 in the counter 1250 depends upon the unit of the chart ordinate being scanned, as previously explained, and this "weighting" is determined by the point of entry of the amplified clock pulses P1220 as permitted by the shift count in the shift register 1300 in turning ON the respective inverter 72, 74, 76, 187, 188, 189, 190, 191, or 192 by applying a negative potential to its respective base. The shift register also functions concurrently to control the "weighting" of the log pulses P4010 by controlling the points of entry thereof into the log counter 100.

*Shift register*

The shift register 1300 is controlled primarily by the "start scan" pulse P8010 and the "end scan" pulse P8020 in presetting the flip-flops 1301–1309, the amplified clock pulse P1222 in presetting flip-flop 1310, and gated amplified clock pulse P1320 which provides for the desired shifts in accordance with the synchronized scanning and counting.

At start and at end scan time, a "start scan" pulse P8010 and an "end scan" pulse P8020 respectively is applied to the "OR" gate inverter bases 195*b* and 196*b*, which generate presetting pulses P1321 by the pulse amplifier 194. These pulses preset the shift register so that flip-flop 1301 is ON and all others are OFF.

The present of flip-flop 1301 ON applies negative potential to inverter base 224*b*, which allows clock pulse P1220 to pass through inverter 224 to the complementing input of flip-flop 1204. After a sufficient count has entered flip-flop 1204 to set flip-flops 1201–1203 ON, gate G6 grounds inverter emitter 178*e* as previously explained.

This results in a negative potential on inverter base 269*b*, which allows the next clock pulse P1100 on inverter base 270*b* to pass to a pulse amplifier 275, where it is amplified and emitted as pulse 1320. This pulse is applied to inverter bases 276*b*–294*b*. If flip-flop 1301 is ON, it is reset by presetting pulse 1320 passing through inverter 276.

Also, at this time, pulse 1320 passes through inverter 277, since its emitter is grounded by ground potential on the "0" terminal of flip-flop 1301. With inverter collector 260*c* negative, gate G6 inverter base 255*b* also is negative and allows clock pulse P1100 to pass into pulse amplifier 253 from which it is emitted as amplified clock pulse P1221. This latter pulse resets all flip-flops 1201–1212 of counter 1250. The setting of shift register flip-flop 1302 ON applies negative potential to inverter base 225*b*, which allows clock pulse P1220 to pass through inverters 235 and 225 into the complementing input of flip-flop 1205. This process continues until the eighth shift has occurred.

Flip-flop 1310 is set ON simultaneously with flip-flop 1309 with the eighth shift pulse. This flip-flop serves to indicate the end of the scan time if at least eight shift pulses have occurred between the start and end of a scan. If eight shifts have not occurred, then flip-flop 1310 will be OFF and gate G3 diode 154 will be at a negative potential, so that inverter base 160*b* is negative and its collector grounded. This indicates *not* a good scan. This OFF condition of flip-flops 1310 also grounds gate's G2 diode 157, so that inverter base 159*b* is grounded, and its collector therefore is at a negative potential. This indicates a bad scan. The controls of these have been previously described. The entry point of the log count into the log counter 100, as stated, is controlled by the shift counter for the full value log count, is for entry of the count representative of the logarithm of the value from the zero reference base to the first trace. In order more clearly to understand the operation of the log counter and the entry of log counts therein, it is useful to consider the general mathematics on which these are based.

*Log counter*

Log counter 100 comprises complementing flip-flops 401–415, a number of inverter gate interconnections, and two pulse generators to provide special control pulses, besides various interconnections to the different controls, pulse generators and counting components. When the shift register 1300 is preset initially, its flip-flop 1301 is ON, as previously described. This applies negative potential in the log counter 100, FIG. 11*a*, to inverter base 335*b*. Therefore, since this count is prior to the sensing of a trace, trace counter flip-flop 601 is ON, FIG. 11*f*, which applies negative potential to log counter inverter base 344*b*, FIG. 11*b*, thereby grounding the emitters of log counter inverters 335–343. Also, since at the time the first log pulse P4010 is generated, shift counter flip-flop 1301 is set, this log pulse enters the complementing input of log counter flip-flop 405, which is eight stages up from the binary point flip-flop 413, and is, therefore, weighted to a value of 256.

After the first shift in the shift counter, its flip-flop 1301 is reset and flip-flop 1302 is set. This applies negative potential to log counter inverter base 336*b* and allows log counts to enter the complementing input of flip-flop 406, which is seven stages up from flip-flop 413, and hence is equivalent to a log count of 128. This log count was generated at the 18th clock pulse from the zero reference base, when gate G1 was again satisfied. This count into flip-flop 406 is completed by the 19th clock pulse from the zero reference base, and the count in the log counter 100 now is representative of a value of 128+256 or 384. This procedure continues until an "end scan" pulse P8020 is generated, which then inhibits the further entry of count in the log counter, and controls determine whether to enter the complement of the log count into the memory 155 or to enter the count in the memory into the log counter, depending on whether or not the scan was a good scan, as has been previously generally described. A good scan, as stated, requires sensing of two and only two traces. The illustrated computer not only provides for extracting the $\sqrt{hP}$, as explained, but also introduces corrections for the width of the traces. This can more readily be explained by reference to FIG. 2.

In FIG. 2, the curve represents the general equation $y=\log x$. Referring to the FIG. 4 chart, the two traces $T_1=h$ and $T_2=P$, both of perceptible width at time 6:00 p.m., the values to be determined are the log $T_1$ and ½ log $T_2$ in order to count ½ (log $T_1$+log $T_2$). This is more easily measurable as the equivalent value log $T_1$+½ (log $T_2$−log $T_1$). Since $T_1$ and $T_2$ have discernable widths, a more accurate result is obtained by measuring $T_1$ to half the distance between its leading edge $T_{1L}$ and its trailing edge $T_{1T}$. Similarly, $T_2$ is more accurately represented as half way between its leading edge $T_{2L}$ and its trailing edge $T_{2T}$.

The actual value desired is the (1) $$\sqrt{hp}=\sqrt{T_1T_2}$$

or:

(2) Generally: $$Q=\log^{-1}[½(\log T_1+\log T_2)]$$

(3) $$Q=\log^{-1}[\log T_1+½(\log T_2-\log T_1)]$$

Where $T_{1L}$ and $T_{2L}$ are leading edges of traces $T_1$ and $T_2$, and $T_{1T}$ and $T_{2T}$ are trailing edges of traces $T_1$ and $T_2$, the trace value read to the center of the trace will make (3):

(4)
$$Q=\log^{-1}\left[\log\left(T_{1L}+\frac{T_{1T}-T_{1L}}{2}\right)+½\left(\log\left(T_{2L}+\frac{T_{2T}-T_{2L}}{2}\right)-\log\left(T_{1L}+\frac{T_{1T}-T_{1L}}{2}\right)\right)\right]$$

For traces of conventional reasonable widths:

(5) $$\log\left(T_L+\frac{T_T-T_L}{2}\right)$$

is quite close to log $$T_L+\frac{\log T_T-\log T_L}{2}$$

For most cases this is well within the accuracy of the chart trace recording.

Substituting (5) in 4:

(6)
$$Q=\log^{-1}\left[\log T_{1L}+\frac{\log T_{1T}-\log T_{1L}}{2}+½\left(\log T_{2L}+\frac{\log T_{2T}-\log T_{2L}}{2}-\log T_{1L}-\frac{\log T_{1T}-\log T_{1L}}{2}\right)\right]$$

(7)
$$Q=\log^{-1}\left[\log T_{1L}+\frac{\log T_{1T}-\log T_{1L}}{2}+\frac{\log T_{2L}-\log T_{1L}}{2}-\frac{\log T_{1T}-\log T_{1L}}{4}+\frac{\log T_{2T}-\log T_{2L}}{2}\right]$$

(8)
$$Q=\log^{-1}[\log T_{1L}+¼(\log T_{1T}-\log T_{1L})+½(\log T_{2L}-\log T_{1L})+¼(\log T_{2T}-\log T_{2L})]$$

Analyzing (8) in terms of counts to be entered into a log counter, it has a full value count, a half value count, and two quarter value counts. This lends itself very conveniently to entry into a straight binary counter by entering the full value count into one flip-flop, the half value count into the next lower count value flip-flop, and the two quarter value counts into the second lower count value flip-flop, thereby automatically performing the correct additions of the logarithmic values represented by the log count signals (log pulses). These terms bear a simple power of 2 relationship.

A further analysis shows the full value count to be the logarithm of the count to the leading edge of the first trace sensed, the half value count to be the logarithm of the count between the leading edges of the two traces, and the two quarter value counts to be of the logarithms of the widths of the two traces. Logic circuits are used to provide for automatically entering the counts in the binary flip-flop counting units which give the desired values thereto as powers of two.

Log pulses 4010 will pass through inverter 345, as previously explained, and the inverter emitters **335*e*–343*e* are grounded. Since trace counter flip-flop 602 is OFF until the first trace is sensed, inverter 317 remains OFF. The clamped load on inverter emitter 346*e* prevents its affecting flip-flop 406** under these conditions.

With shift requister flip-flop 1302 ON, and inverter emitter **336*e* grounded, the inverter 336 is turned ON and a count is entered into flip-flop 406, either until flip-flop 602** is turned OFF (indicating sensing of the first trace) or there is a shift in the shift register.

For purposes of simplifying the explanation, it will be assumed that there has been no shift in the shift register. Flip-flop 602 is turned ON when the leading edge of the first trace is sensed. This grounds inverter collector **317*c* on occurrence of the next log pulse 4010 impressed on inverter base 316*b*, and grounds inverter emitters 346*e*–354*e*. Simultaneously, flip-flop 601 is turned OFF, whereby inverter 334 is turned OFF and the clamped load on inverter collector 334*c* turns OFF inverters 335–343. With shift register flip-flop 1302 still ON, inverter collector 347*c* is grounded, whereby a count is entered into flip-flop 407**.

As in any straight binary counter, the value of the count in the next lower count flip-flop represents half the value of count in the next higher flip-flop. Thus, a count into flip-flop 407 has a value of half a count in flip-flop 406, and that in flip-flop 408 half of the value of a count in flip-flop 407 and a fourth of the value of a count in flip-flop 406. The log count entering flip-flop 407 from a sensing of the leading edge of the first trace has, therefore, a value of only half the count entering flip-flop 406 up to the sensing of the leading edge of the first trace.

During passage over the trace, flip-flop 632 is set and a pulse is to be entered another stage lower (flip-flop 408) to give the desired ¼ effect. During passage over the first trace, i.e. after the first leading edge signal and before the first trailing edge signal, both flip-flops 602 and 632 will be set. Since the log counter can only accept one pulse at a time, the pulse entering the lowest order flip-flop of the three is delayed one clock time by using a delayed log pulse P4011 rather than log pulse P4010. This delayed log pulse P4011 is generated one clock pulse after the corresponding log pulse by a delayed log pulse generator 375.

A suitable delayed log pulse generator 375 is shown as comprising a flip-flop 422, with two input inverters 373 and 374, a triggering inverter 376, and a pulse amplifier 377. When a log pulse P4010 is applied to inverter base **373*b*, flip-flop 422 is set and grounds inverter emitter 376*e*, which allows the next clock pulse P1100 to pass to pulse amplifier 377. This produces a delayed log pulse P4011** for use as described.

This pulse P4011 also is fed back to inverter base **374*b* and resets flip-flop 422, thereby allowing entry of only one clock pulse P1100 to generate one delayed log pulse P4011 for each pulsing by a log pulse P4010**. The point form resolution of measurements made by said scanning means.

12. Apparatus comprising means for scanning ordinates of a chart and progressively advancing over the abscissa thereof and having means for sensing the leading edge of a trace on a chart and generating a signal thereat and for sensing the trailing edge of a trace and generating a signal thereat, means for measuring the linear values represented by the ordinates from given points of the leading and trailing edges of traces sensed, means for converting said measured linear values into signals representative of corresponding logarithmic values, alogarithmic counting means comprising a binary counter with gates for entering a weighted count in said binary counter representative of the full logarithmic value of the linear value to the leading edge of the first trace sensed during a scan, said logarithmic counting means including gates for entering a weighted count into the next lower entry point of said binary counter representative of half the logarithmic value of the linear value between the leading edges of the first and second traces sensed by said scanning means during a scan, said logarithmic counting means including gates for entering a weighted count into the second lower entry point from the full value entry point of said binary counter representative of a quarter the logarithmic value of the linear value of the width of each of said traces sensed and providing a summation of said entries, means including an accumulator for computing the antilog of the summation in said logarithmic counting means and for integrating said antilogs in said accumulator for a predetermined number of scans.

13. Apparatus comprising means for scanning ordinates of a chart and progressively advancing relative to the abscissa of the chart and having means for sensing the leading edge of a trace on a chart and generating a signal thereat and for sensing the trailing edge of a trace and generating a signal thereat, means for measuring the linear values represented by the ordinates from given points of the leading and trailing edges of traces sensed, means for converting said measured linear values into signals representative of corresponding logarithmic values, a logarithmic counting means comprising a binary counter with gates for entering a weighted count in said binary counter representative of the full logarithmic value of the linear value to the leading edge of the first trace sensed during a scan, said logarithmic counting means including gates for entering a weighted count into the next lower entry point of said binary counter representative of half the logarithmic value of the linear value between the leading edges of the first and second traces sensed by said scanning means during a scan, said logarithmic counting means including gates for entering a weighted count into the second lower entry point from the full value entry point of said binary counter representative of a quarter the logarithmic value of the linear value of the width of each of said traces sensed and providing a summation of said entries, a memory means, means for determining a good scan as one having sensed only two traces, means for determining a bad scan as one not having sensed two traces, means for entering a representation of said summation in said memory on completion of a good scan, means for clearing said summation on detection of a bad scan and entering the representation in said memory of the last previous good scan into said logarithmic counting means, an accumulator, and means for computing the antilog of the summation representation in said logarithmic counting means and entering it into said accumulator for integrating said antilog for a predetermining number of scans.

14. Apparatus comprising means for scanning ordinates of a circular chart having a zero reference base and sensing a trace on the chart even if slightly below the zero reference base, a source of clock pulses, means for counting clock pulses occurring during a scan from a given ordinate point to the trace sensed for linearly measuring the value represented by the ordinate of the sensed trace on the chart from the given ordinate point, means for determining the zero reference base, means for correcting the clock pulse linear measurement according to the determined zero reference base, logarithmic representation generating and counting means comprising a pulse counting and signal generating means for counting a predetermined number of clock pulses from the zero reference base and generating a first log signal representing a linear value of a single-increment first log unit and for subsequently counting predetermined numbers of clock pulses for predetermined increasing numbers of progressively larger increments within successively higher log units wherein the clock pulse count for each log unit initial increment begins with the same clock pulse count as said first log unit single increment, said clock pulse counting and log signal generating means generating a log signal for each of said increments wherein said log signals are representative of a logarithmic progression for the linear values measured by the clock pulses and the log signals for successively higher log units increase substantially as a power of two, said log units being representative of linear ordinates of the chart progressively increasing from the zero reference base thereon substantially according to a power of two, a binary log counter comprising a plurality of successive counting units, means for entering the log signal count of said first log signal into a counting unit removed from the binary one entry counting unit of said log counter the same number of counting units as the number of log units to be scanned, and means for entering the log signal counts of log signals for successively higher log units into successively lower counting units of said binary log counter whereby the log signals of successive log units are weighted successively decreasingly by a power of two in the log counter thereby providing substantially uniform resolution of measurements made by said scanning means.

15. Apparatus comprising means for scanning ordinates of a chart and sensing traces on the chart, means for advancing the chart at a predetermined rate for progressively advancing the scan relative to the abscissa of the chart, clock-pulse generating means, means for counting clock pulses occurring during a scan from given points to the traces sensed for measuring values represented by the ordinate distance of the sensed traces on the chart from given ordinate points, means for determining a zero reference base, logarithmic representation generating and counting means comprising a pulse counting and signal generating means for counting a predetermined number of clock pulses from the zero reference base and generating a first log signal representing a linearly measured value of a single-increment first log unit and for subsequently counting predetermined numbers of clock pulses for predetermined increasing numbers of progressively larger increments within successively higher log units wherein the count for each log unit initial increment begins with the same count as said first log unit single increment, said pulse counting and signal generating means generating a log signal for each of said increments wherein said log signals are representative of a logarithmic progression for the linear values measured by the clock pulses determined by the traces sensed by said scanning means, said log units being representative of linear ordinates of the chart progressively increasing from a zero reference base thereon according to a power of two, a binary log counter comprising a plurality of successive counting units, means for entering the log signal count of said first log signal into a counting unit of said log counter, means for entering the log signal counts of log signals for successively higher log units into successively lower counting units of said binary log counter whereby the log signals of successive log units are weighted successively descreasingly by a power of two in the log counter thereby providing substantially uniform resolution of measurements made by said scanning means, said means for entering log signals into a log counter unit representative of the logarithm of the value measured being connected to enter a full value count for such signals during a scan to the first trace sensed and similarly to enter log signals into a log counter unit representative of the logarithm of half the value measured between the first trace and a second trace sensed during said scan and for providing a summation of said binary logarithmic full value and half value representations, said scanning means having means for generating a start-scan signal representing the start of a scan of a chart and means for generating an end-scan signal representing the end of a scan, a binary counter memory, means for clearing said memory when a scan cycle is not detected as a bad scan by said bad-scan detecting means and for complementing said binary log counter logarithmic representation summation, means for entering said complemented summation into said memory, means for clearing said binary logarithmic representation summation when a scan cycle is detected as a bad scan by said bad-scan detecting means and resetting said log counter logarithmic representation to agree with the count represented in said memory of the last preceding good-scan cycle, a binary coded digital accumulator, means for computing and entering into said accumulator the linear antilog of said logarithmic representation summation comprising generating a logarithmic representation by said logarithmic representation generating means and entering a linear count into said accumulator measured by the logarithmic representation count required to fill said complemented summation in said log counter and integrating the count of successive scans in said accumulator, means for counting the number of scans, and means for preventing the entry of further counts into said accumulator after said scan counting means determines the completion of a predetermined abscissa scan as indicated by the number of scans counted.

16. Apparatus comprising means for scanning ordinates of a chart and sensing traces on the chart, means for progressively advancing the scan relative to the abscissa of the chart, clock-pulse generating means, means for counting clock pulses occurring during a scan from given points to the traces sensed for measuring values represented by the ordinate distance of the sensed traces on the chart from given ordinate points, means for determining a zero reference base, logarithmic representation generating and counting means comprising a pulse counting and signal generating means for counting a predetermined number of clock pulses from the zero reference base and generating a first log signal representing a linearly measured value of a single-increment first log unit and for sugsequently counting predetermined numbers of clock pulses for predetermined increasing numbers of progressively larger increments within successively higher log units wherein the count for each log unit initial increment begins with the same count as said first log unit single increment, said pulse counting and signal generating means generating a log signal for each of said increments wherein said log signals are representative of a logarithmic progression for the linear values measured by the clock pulses determined by the traces sensed by said scanning means, said log units being representative of linear ordinates of the chart progressively increasing from a zero reference base thereon according to a power of two, a binary log counter comprising a plurality of successive counting units, means for entering the log signal count of said first log signal into a counting unit of said log counter, means for entering the log signal counts of log signals for successively higher log units into successively lower counting units of said binary log counter whereby the log signals of successively log units are weighted successively decreasingly by a power of two in the log counter thereby providing substantially uniform resolution of measurements made by said scanning means, said scanning means having means for detecting the leading edge of a trace and generating a signal thereat and means for detecting the trailing edge of a trace and generating a signal thereat, said means for entering log signals into a log counter unit representative of the logarithm of the value measured during a scan including means response to the detection of the leading edge of the first trace sensed during a scan for entering a full value count for such signals and similarly entering log signals into a log counter unit representative of the logarithm of half the value measured between the leading edges of said first trace and a second trace sensed during said scan as determined by the signals thereat generated by said scanning means and additionally entering signals in a log counter unit representative of the logarithm of a quarter the value measured between the leading and trailing edges of each of the two traces sensed during said scan and for providing a summation of said binary logarithmic full value, half value, and quarter value representations, said scanning means having means for generating a start-scan signal representing the start of a scan of a chart and means for generating an end-scan signal representing the end of a scan, a binary counter memory, means for clearing said memory when a scan cycle is not detected as a bad scan by said bad-scan detecting means and for completing said log counter logarithmic representation summation, means for entering said complemented summation into said memory, means for clearing said logarithmic representation summation when a scan cycle is detected as a bad scan by said bad-scan detecting means and resetting said log counter logarithmic representation to agree with the count represented in said memory of the last preceding good scan cycle, a binary coded digital accumulator, means for computing and entering into said accumulator the linear antilog of said logarithmic representation summation comprising generating and counting a logarithmic representation by said logarithmic representation generating and counting means and entering a count into said accumulator measured by the log count required to fill said complemented summation in said log counter and integrating the count of successive scans in said accumulator, means for counting the number of scans, and means for preventing the entry of further counts into said accumulator after said scan counting means determines the completion of a predetermined abscissa scan as indicated by the number of scans counted.

| | | | |
|---|---|---|---|
| 2,376,235 | 5/1945 | De Castro | 250—236 |
| 2,428,811 | 10/1947 | Rajchman | 235—164 |
| 2,873,381 | 2/1959 | Lauroesch | 250—236 |
| 2,914,248 | 11/1959 | Ross et al. | 235—157 |
| 3,099,742 | 7/1963 | Byrne | 235—150 |

ROBERT C. BAILEY, *Primary Examiner.*

MALCOLM A. MORRISON, *Examiner.* ing the traces during each scan, bad-scan detecting means for determining scans during which other than two traces are sensed during a scan, means for generating signals representative of the logarithms of the values sensed by said scanning means from a reference base to the leading edge of the first trace and of the value measured between the leading edges of said first trace and a second trace and of the value measured between the leading and trailing edges of each of the two traces sensed during a scan, a binary log counter having means for entering a count representative of the full logarithmic value from the reference base to the leading edge of the first trace sensed by said scanning means and means for entering a count representative of half the logarithmic value measured between the leading edges of said two traces and means for entering a count representative of a quarter of the logarithmic value measured between the leading and trailing edges of each of the two traces and for providing a summation of said binary logarithmic full value and half value and quarter value representations, said scanning means having means for generating a start-scan signal representing the reference base start of a scan of a chart and means for generating an end-scan signal representing the end of a scan, a binary counter memory, means for clearing said memory when a scan cycle is not detected as a bad scan by said bad-scan detecting means and for complementing said binary logarithmic representation summation, means for entering said complemented summation in said memory, means for clearing said binary logarithmic representation summation when a scan cycle is detected as a bad scan by said bad-scan detecting means and resetting said logarithmic representation counting means to agree with the count complement of the logarithm represented in said memory of the last preceding good-scan cycle, a binary coded digital accumulator, means for computing and entering into said accumulator the linear antilog of said logarithmic representation summation comprising generating a logarithmic representation by said logarithmic representation generating means and entering a linear count into said accumulator measured by the logarithmic representation count required to fill said complemented summation in said log counter and integrating the count of successive scans in said accumulator, and means for preventing the entry of further counts in said accumulator after a predetermined number of scans.

6. Apparatus comprising scanning means for measuring values represented by the distances of traces on a chart from given points thereon, said scanning means having means for detecting the leading edge of a trace and generating a signal thereat and means for detecting the trailing edge of a trace and generating a signal thereat, means for counting the traces during each scan, bad-scan detecting and counting means for determining and counting scans during which other than the desired number of traces are detected and for giving an indication of the occurrence of a preselected number of such bad scans during a chart computation, means for variably preselecting the number of bad scans at which said indication is given, means for generating and counting signals representative of the logarithm of the value measured from a reference base to the leading edge of the first trace detected during a scan and similarly representative of half of the logarithm of the value measured between the leading edges of said first trace and a second trace detected during said scan as determined by the signals thereat generated by said scanning means, said logarithmic signal generating and counting means also generating and counting signals representative of a quarter of the logarithm of the value measured between the leading and trailing edges of each of the two traces sensed during said scan and for providing a summation of said logarithmic full value, half value, and quarter value representations, said scanning means having means for generating a start-scan signal representing the start of a scan of a chart and means for generating an end-scan signal representing the end of a scan, a binary counter memory, means for clearing said memory when a scan cycle is not detected as a bad scan by said bad-scan detecting means and for complementing said logarithmic representation summation, means for entering said complemented summation in said memory, means for clearing said logarithic representation summation when a scan cycle is detected as a bad scan by said bad-scan detecting means and resetting said logarithmic representation counting means to agree with the count represented in said memory of the last preceding good-scan cycle, a binary coded digital accumulator, means for computing and entering into said accumulator the antilog of said logarithmic summation representation comprising generating and counting a logarithmic representation by said logarithmic representation generating and counting means and entering a count into said accumulator measured by the count required to fill said complemented summation in said logarithmic representation counting means and integrating the count of successive scans in said accumulator, means for counting the number of scans, and means for preventing the entry of further counts in said accumulator after said scan counting means determines the completion of a predetermined number of scans.

7. Apparatus comprising scanning means for measuring values represented by the distances of two traces on a chart from given points, said scanning means having means for detecting the leading edge of a trace and generating a signal thereat and means for detecting the trailing edge of a trace and generating a signal thereat, means for counting the traces during each scan, bad-scan detecting and counting means for determining and counting scans during which other than two traces are sensed and for giving an indication of the occurrence of a preselected number of such bad scans during a chart computation, means for generating signals representative of the logarithms of the values sensed by said scanning means from a reference base to the leading edge of the first trace and of the value measured between the leading edges of said first trace and a second trace and of the value measured between the leading and trailing edges of each of the two traces sensed during a scan, a binary log counter having means for entering a count representative of the full logarithmic value from the reference base to the leading edge of the first trace sensed by said scanning means and means for entering into said binary log counter a count representative of half the logarithmic value measured between the leading edges of said two traces and means for entering into said binary log counter a count representative of a quarter of the logarithmic value measured between the leading and trailing edges of each of the two traces, said binary log counter having means for providing a summation of said binary logarithmic full value, half value, and quarter value representations, said scanning means having means for generating a start-scan signal representing the reference base start of a scan of a chart and means for generating an end-scan signal representing the end of a scan, a binary counter memory, means for clearing said memory when a scan cycle is not detected as a bad scan by said bad-scan detecting means and for complementing said binary logarithmic representation summation, means for entering said complemented summation in said memory, means for clearing said binary logarithmic representation summation when a scan cycle is detected as a bad scan by said bad-scan detecting means and resetting said logarithmic representation counting means to agree with the count complement of the logarithm represented in said memory of the last preceding good-scan cycle, a binary coded digital accumulator, means for computing and entering into said accumulator the linear antilog of said logarithmic representation summation comprising said logarithmic signal generating means for generating a logarithmic representation and entering said latter logarithmic representation into said complemented binary log counter and for receiving and entering a linear count into said accumulator measured by the logarithmic representation count required to fill said complemented summation in said log counter and integrating the count of successive scans in said accumulator, means for counting the number of scans, and means for preventing the entry of further counts in said accumulator after said scan counting means determines the completion of a predetermined number of scans.

8. Apparatus for solving the equation $Z=\sqrt{XY}$ comprising, a binary counter, electronic means for generating a first signal representative of the value of log X and a second signal representative of the value of log $Y$—log $X$, control gate means for entering the first signal into said binary counter at a first entry point and for entering the second signal into the binary counter at the next lower entry point from said first entry point whereby said second signal value is halved in its addition to said first signal value in said counter, means for complementing said counter after entry of said second signal value therein, an accumulator, means for simultaneously generating a signal representative of a logarithmic value including said electronic logarithmic value signal generating means and means for generating a linear signal and entering them into said binary counter and accumulator respectively, means responsive to said latter logarithmic signals returning said binary counter to zero for stopping the entry of the linear signal into said accumulator whereby the sum of the entry at the time of stopping represents the antilog of $$\frac{\log X+\log Y}{2} \text{ and is equal to } \sqrt{XY}$$

9. Apparatus comprising means for scanning ordinates of a chart and sensing a trace on the chart, means for generating clock pulses, means for counting clock pulses occurring during the scan from the given point to the trace sensed for linearly measuring values represented by the ordinate distance of the sensed trace on the chart from a given ordinate point, means for determining a zero reference base, and logarithmic representation generating and counting means comprising a pulse counting and signal generating means for counting a predetermined number of clock pulses from the zero reference base and generating a first log signal representing a linear value of a single-increment first log unit and for subsequently counting predetermined numbers of clock pulses for predetermined increasing numbers of progressively larger increments within successively higher log units wherein the pulse count for each log unit initial increment begins with the same pulse count as said first log unit single increment, said pulse counting and signal generating means generating a log signal for each of said increments whereby said log signals are representative of a logarithmic progression for the linear values measured by the clock pulses, said log units being representative of linear ordinates of the chart progressively increasing from the zero reference base thereon according to a power of two.

10. Apparatus including scanning means for measuring values represented by the ordinate distance of two traces on a chart from given points, said scanning means having a rotatable scanning head with electromagnetic means for sensing the leading edge of a trace and generating a signal thereat and means for sensing the trailing edge of a trace and generating a signal thereat, a source of clock timing pulses, means for counting clock timing pulses occurring during a scan from a given point to the trace sensed for measuring the value represented thereby, means for counting the traces during each scan, means for generating signals representative of the logarithms of the values measured by said scanning means from a zero reference base as the given point to the leading edge of the first trace and of the value measured between the leading edges of said first trace and a second trace and of the value measured between the leading and trailing edges of each of the two traces sensed during a scan, a binary log counter having means for entering a count representative of the full logarithmic value to the leading edge of the first trace sensed by said scanning means and means for entering a count representative of half the logarithmic value measured between the leading edges of said two traces and means for entering a count representative of a quarter of the logarithmic value measured between the leading and trailing edges of each of the two traces and for providing a summation of said binary logarithmic full value, half value, and quarter value representations, said scanning means comprising an electromagnetic beam transmitting aperture in said scanning head and adjustably mounted spaced sensing means for sensing the transmission of an electromagnetic beam through said aperture and for generating a start-scan signal and an end-scan signal, a binary counter memory, means for clearing said memory when a scan cycle is not detected as a bad scan by said bad-scan detecting means and for complementing said binary logarithmic representation summation, means for entering said complemented summation in said memory, means for clearing said binary logarithmic representation summation when a scan cycle is detected as a bad scan by said bad-scan detecting means and resetting said logarithmic representation counting means to agree with the count represented in said memory of the last preceding good-scan cycle, a binary accumulator, means for computing and entering into said accumulator the linear antilog of said logarithmic representation summation comprising generating a logarithmic representation by said logarithmic representation generating means and entering a linear count into said accumulator measured by the logarithmic representation count required to fill said complemented summation in said log counter and integrating the count of successive scans in said accumulator, means for advancing the chart abscissa relative to said scanning means in synchronized relation to rotation of said scanning head, and means for preventing the entry of counts into said accumulator after the completion of a predetermined number of scans.

11. Apparatus comprising means for scanning ordinates of a chart and sensing a trace on the chart, means for generating clock pulses, means for counting clock pulses occurring during the scan from the given point to the trace sensed for linearly measuring values represented by the ordinate distance of the sensed trace on the chart from a given ordinate point, means for determining a zero reference base, logarithmic representation generating and counting means comprising a pulse counting and signal generating means for counting a predetermined number of clock pulses from the zero refer ence base and generating a first log signal representing a linear value of a single-increment first log unit and for subsequently counting predetermined numbers of clock pulses for predetermined increasing numbers of progressively larger increments within successively higher log units wherein the pules count for each log unit initial increment begins with the same pulse count as said first log unit single increment, said pulse counting and signal generating means generating a log signal for each of said increments wherein said log signals are representative of a logarithmic progression for the linear values measured by the clock pulses, said log units being representative of linear ordinates of the chart progressively increasing from the zero reference base thereon according to a power of two, a binary log counter comprising a plurality of successive counting units, means for entering the log signal count of said first log signal into a counting unit of said log counter, and means for entering the log signal counts of log signals for successively higher log units into successively lower counting units of said binary log counter whereby the log signals of successive log units are weighted successively decreasingly by a power of two in the log counter thereby providing substantially uni-

UNITED STATES PATENT OFFICE

CERTIFICATE OF CORRECTION

Patent No. 3,226,532 December 28, 1965

Edward Gordon et al.

It is hereby certified that error appears in the above numbered patent requiring correction and that the said Letters Patent should read as corrected below.

Column 27, lines 45 to 48 should appear as shown below instead of as in the patent:

$$\text{is quite close to } \log T_L + \frac{\log T_F - \log T_L}{2}$$

Signed and sealed this 10th day of January 1967.

(SEAL)
Attest:

ERNEST W. SWIDER
Attesting Officer

EDWARD J. BRENNER
Commissioner of Patents

UNITED STATES PATENT OFFICE
CERTIFICATE OF CORRECTION

Patent No. 3,226,532 December 28, 1965

Edward Gordon et al.

It is hereby certified that error appears in the above numbered patent requiring correction and that the said Letters Patent should read as corrected below.

Column 27, lines 45 to 48 should appear as shown below instead of as in the patent:

is quite close to $\log T_L + \frac{\log T_F - \log T_L}{2}$

Signed and sealed this 10th day of January 1967.

(SEAL)
Attest:

ERNEST W. SWIDER
Attesting Officer

EDWARD J. BRENNER
Commissioner of Patents